United States Patent
Bertagna

(10) Patent No.: US 8,112,039 B2
(45) Date of Patent: Feb. 7, 2012

(54) SYSTEM AND METHOD FOR DETECTING RADAR SIGNALS IN WIRELESS COMMUNICATIONS ACCESS POINTS

(75) Inventor: Drew Bertagna, Thousand Oaks, CA (US)

(73) Assignee: Xirrus, Inc., Thousand Oaks, CA (US)

( * ) Notice: Subject to any disclaimer, the term of this patent is extended or adjusted under 35 U.S.C. 154(b) by 1031 days.

(21) Appl. No.: 12/001,782

(22) Filed: Dec. 11, 2007

(65) Prior Publication Data
US 2010/0039308 A1 Feb. 18, 2010

Related U.S. Application Data

(60) Provisional application No. 60/869,510, filed on Dec. 11, 2006.

(51) Int. Cl.
*H04B 1/00* (2006.01)
(52) U.S. Cl. ......... 455/63.1; 455/450; 342/201; 342/93; 342/20; 375/130; 375/295; 600/453; 600/529; 600/534; 705/37; 705/75; 73/633
(58) Field of Classification Search ............... 455/63.1, 455/450; 342/201, 93, 20; 600/453, 529, 600/534; 705/37, 75; 73/633
See application file for complete search history.

(56) References Cited

U.S. PATENT DOCUMENTS

| | | | |
|---|---|---|---|
| 7,209,523 B1 * | 4/2007 | Larrick et al. | 375/295 |
| 7,369,598 B2 * | 5/2008 | Fontana et al. | 375/130 |
| 7,701,382 B2 * | 4/2010 | Hansen | 342/52 |
| 7,702,291 B2 * | 4/2010 | Hansen | 455/73 |
| 2006/0199587 A1 * | 9/2006 | Hansen | 455/442 |
| 2007/0281638 A1 * | 12/2007 | Hansen | 455/127.4 |
| 2009/0310661 A1 * | 12/2009 | Kloper et al. | 375/224 |
| 2010/0240999 A1 * | 9/2010 | Droitcour et al. | 600/453 |

* cited by examiner

*Primary Examiner* — Temesgh Ghebretinsae
*Assistant Examiner* — April G Gonzales
(74) *Attorney, Agent, or Firm* — The Eclipse Group LLP

(57) ABSTRACT

A system and method for providing radar signal detection in a communications system. In an example method, a raw energy detect signal is received and analyzed to determine if the raw energy detect signal contains a valid radar pulse. A bit is stored in a bit sequence storage device such that the bit has a first value if a valid radar pulse was detected or a second value indicating that a valid pulse was not detected. A set of bits in the bit sequence storage device are accessed to determine if a plurality of waveform-indicating locations in the bit sequence storage device includes valid pulses. In another aspect of the invention, a system detects a radar signal in a communications device. The system includes a pulse detector to detect pulses in a raw energy signal having a pulse width within a predetermined minimum and maximum pulse width. The system includes a frequency detector having a bit sequence storage device to store the bits output by the pulse detector. The frequency detector detects whether the detected pulses conform to a waveform type by determining if the bits are stored in the bit sequence storage device in waveform-indicating locations.

36 Claims, 13 Drawing Sheets

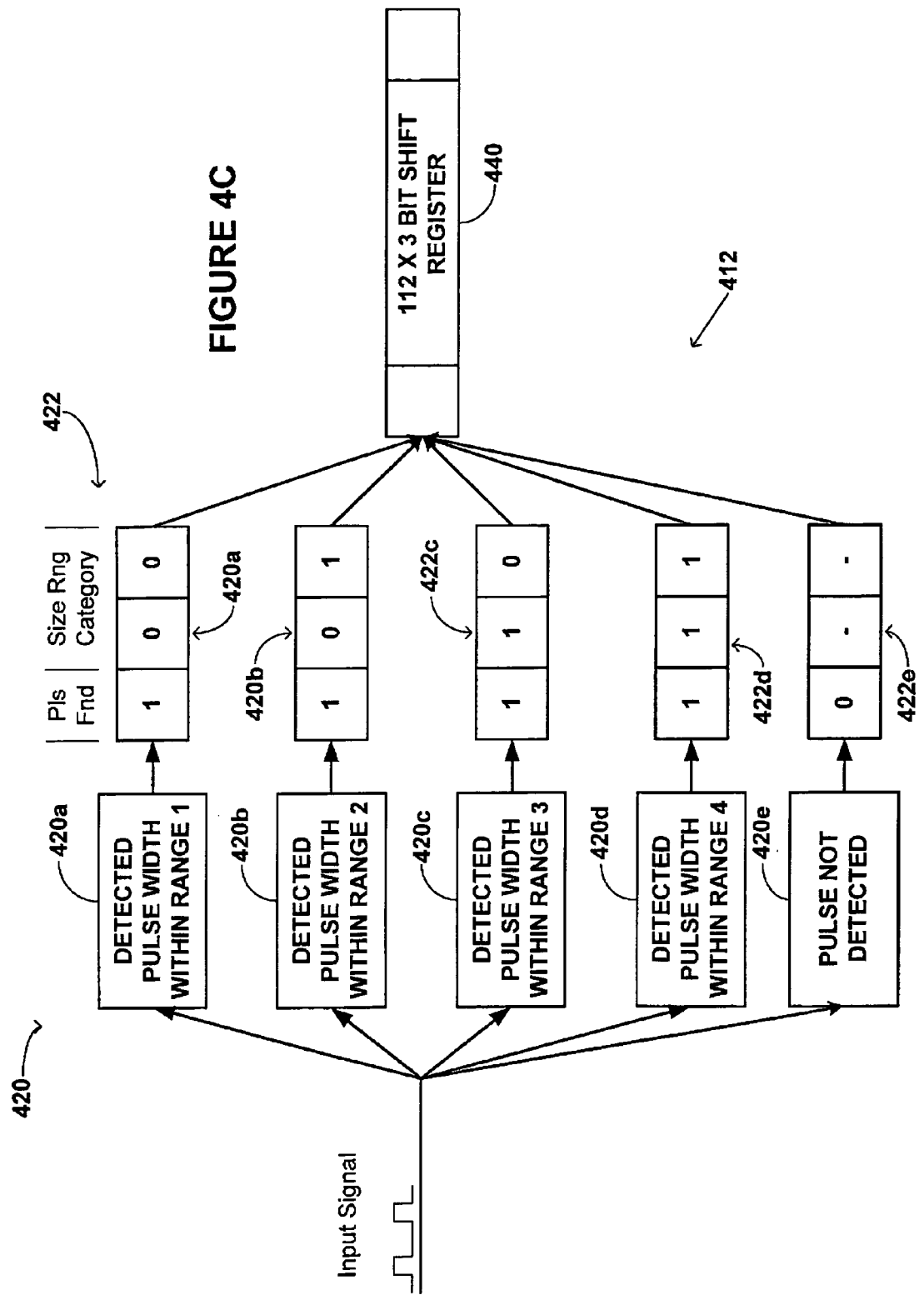

SYSTEM AND METHOD FOR DETECTING RADAR SIGNALS IN WIRELESS COMMUNICATIONS ACCESS POINTS

BACKGROUND OF THE INVENTION

1. Field of the Invention

The present invention relates to wireless communications systems and, more particularly, to systems and methods for detecting radar signals in wireless communications systems.

2. Description of Related Art

Wireless communications products that support the IEEE 802.11a standard may communicate using unlicensed frequency bands at around 5 GHz. There are existing radar systems that also operate in some of these frequency bands. Such radar systems are typically associated with public safety and security functions such as air traffic control, military, etc. Wireless communications systems are therefore often required by relevant authorities to give way to radar systems. In general, if there is a radar system actively operating on a particular channel in one of these bands that is shared by 802.11a devices, all 802.11a devices must detect the presence of radar and avoid using the particular channel.

Wireless communications systems may include radar detecting components that perform processes for managing the sharing of the spectrum between 802.11a and radar systems. Operation of such processes may be governed by a Dynamic Frequency Selection (DFS) specification. Various regulatory bodies around the world tend to have their own version of a DFS specification. For example, the United States (care of the Federal Communications Commission, or the FCC), Europe (care of the European Telecommunications Standards Institute, or the ETSI), and Japan each enforce versions of the DFS specifications.

Currently, the DFS enforced in the US contains the most stringent requirements in terms of the number of radar waveform types to be detected. The FCC's DFS Specification specifies that 802.11a devices detect 3 types of radar waveforms: (1) a time-invariant waveform with fixed parameters, (2) a time-invariant waveform with a range of parameters, and (3) a time-varying waveform. In Europe and Japan, the respective DFS specifies that a time-invariant waveform with fixed parameters. Wireless system communications system providers may be designed to conform with the DFS from more than one jurisdiction. Typical solutions for detecting radar employ software-implemented algorithms.

It would be desirable to implement a hardware-based system capable of detecting all three types of waveforms specified by the different DFS's.

SUMMARY

In view of the above, systems and methods are provided for detecting radar signals in communications systems. In an example method, a raw energy detect signal is received and analyzed to determine if the raw energy detect signal contains a valid radar pulse. A valid radar pulse may be a pulse having a pulse width within a predetermined limit. A bit is stored in a bit sequence storage device such that the bit has a first value if a valid radar pulse was detected or a second value indicating that a valid pulse was not detected. Bits are added to the bit sequence storage device to accumulate a series of bits, the bits being stored in the bit sequence storage device in sequential order. A set of bits in the bit sequence storage device are accessed to determine if a plurality of waveform-indicating locations in the bit sequence storage device includes valid pulses. The waveform-indicating locations include selected ones that designate corresponding waveform types, each corresponding to a radar signal. A signal may be generated to indicate that a radar signal is detected when the number of waveform-indicating locations having a valid pulse corresponds to one of the waveform types.

In another aspect of the invention, a system is provided for detecting a radar signal in a communications device. The system includes a pulse detector to detect pulses in a raw energy signal having a pulse width within a predetermined minimum and maximum pulse width. The pulse detector outputs a bit having a first value when the pulse width is within the maximum and minimum or having a second value when the pulse width is not within the maximum and minimum. The system includes a frequency detector having a bit sequence storage device to store the bits output by the pulse detector. The frequency detector detects whether the detected pulses conform to a waveform type by determining if the bits are stored in the bit sequence storage device in waveform-indicating locations.

Various advantages, aspects and novel features of the present invention, as well as details of an illustrated embodiment thereof, will be more fully understood from the following description and drawings.

Other systems, methods and features of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

FIG. 4C is a schematic diagram illustrating shift register operation in an example of the frequency detector in the radar detection system of FIG. 4A.

DETAILED DESCRIPTION

In the following description of preferred embodiments, reference is made to the accompanying drawings that form a part hereof, and which show, by way of illustration, specific embodiments in which the invention may be practiced. Other embodiments may be utilized and structural changes may be made without departing from the scope of the present invention.

Figure 1:
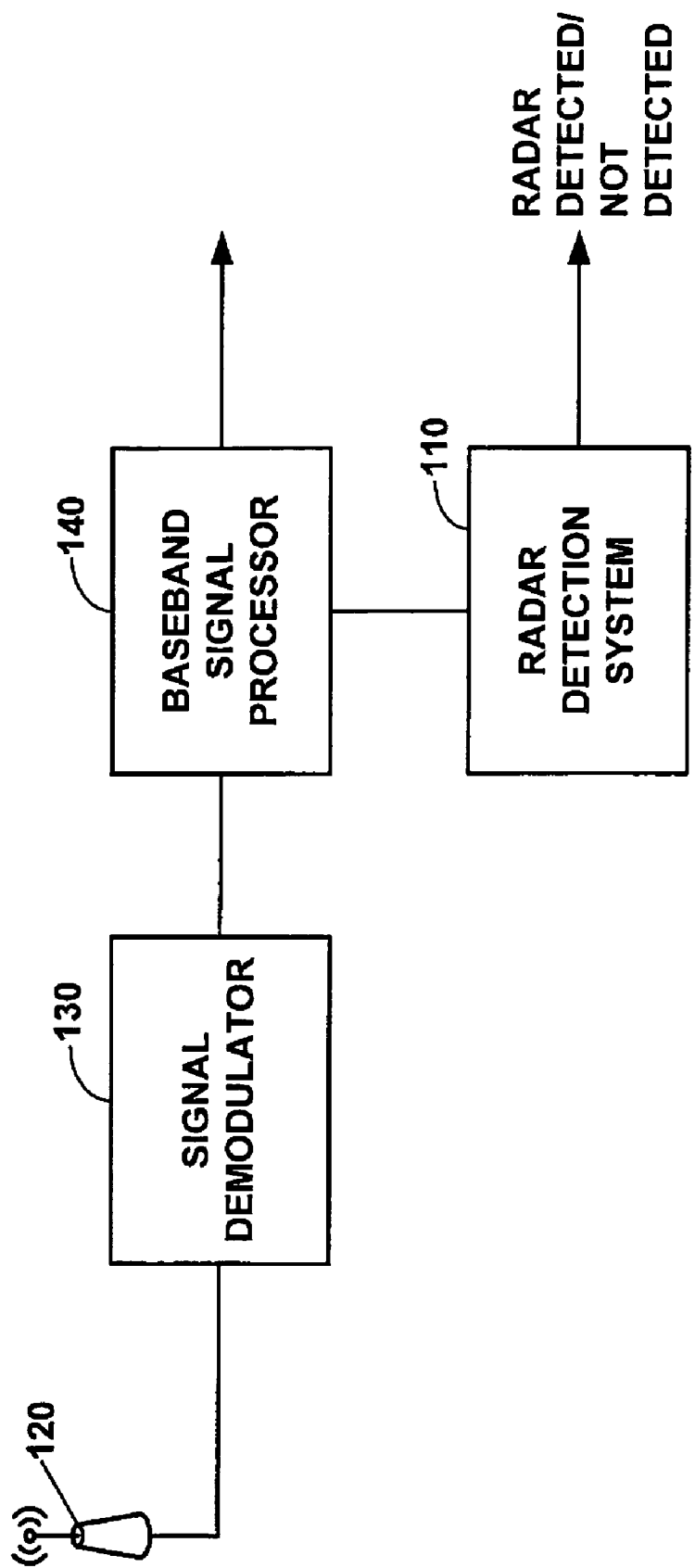
FIG. 1 is a block diagram of an example of a wireless communication system in which a radar detection system consistent with the present invention may be implemented.

FIG. 1 is a block diagram of an example of a wireless communication system 100 in which a radar detection system 110 consistent with the present invention may be implemented. The wireless communication system 100 includes an antenna 120, a signal demodulator 130, and a baseband signal processor 140. The radar detection system 110 receives a raw energy detect signal from the baseband processor 140 as input. In examples of the radar detection system 110 described below, the input signal is processed in accordance with the described example systems and methods to detect three types of radar waveforms. In a typical radar signal, a pulse, or series of pulses, will be created on the raw energy detect signal that mirrors the duration of the radar pulse that is present in the air. The pulse is transmitted in a channel that may be received for processing by the wireless communication system 100. The pulses are processed to determine if they constitute 1 of the 3 radar waveform types. If the radar detection system 110 detects one of the 3 radar waveform types, the radar detection system 110 outputs a signal that indicates that the radar signal has been detected.

The radar detection system 110 may output the signal indicating that radar is detected in any suitable form. In one example, the signal may be an interrupt signal that interrupts software in the wireless communication system 100 to perform other software that directs the wireless communication system 100 to stop communicating over the channel on which the radar signal was detected.

The wireless communication system 130 in FIG. 1 may be any wireless communication system 130 that may communicate over a frequency range that may also be used by a radar system. The radar detection system 110 is included to enable the wireless communication system 100 to enforce restrictions on the use of frequency ranges used by radar systems. The signal demodulator 130 in the wireless communication system 100 receives a radiated input signal from the antenna 120 and demodulates the signal by removing the carrier signal from the radiated input signal to generate a baseband signal. The signal demodulator 130 may be any suitable signal demodulator 130 used in typical wireless communication systems 130 according to any signal modulation scheme.

Typically, the baseband signal is the part of a received input signal that remains when the carrier part of the signal is removed. The baseband signal contains information being communicated to the wireless communication system 100 from a transmitting system. The baseband signal processor 140 receives the baseband signal generated by the signal demodulator 130 and may couple the baseband signal to the radar detection system 110.

In the examples that follow, example radar detection systems and methods consistent with the present invention are described as solutions for detecting radar having one of three different types of waveforms: (1) a time-invariant waveform with fixed parameters, (2) a time-invariant waveform with a range of parameters, and (3) a time-varying waveform. Examples are described below with reference to specific requirements in DFS documents used in the United States, Europe and Japan. Those of ordinary skill in the art will appreciate that the examples below are provided for illustration purposes with no intent to limit the scope of the invention to these examples. Those of ordinary skill in the art will appreciate that examples of radar detections systems consistent with the present invention may be used to detect waveforms characterized by other parameters and spectrum usage requirements.

1. Detection of Radar Having a Time-Invariant Waveform

Figure 2A:
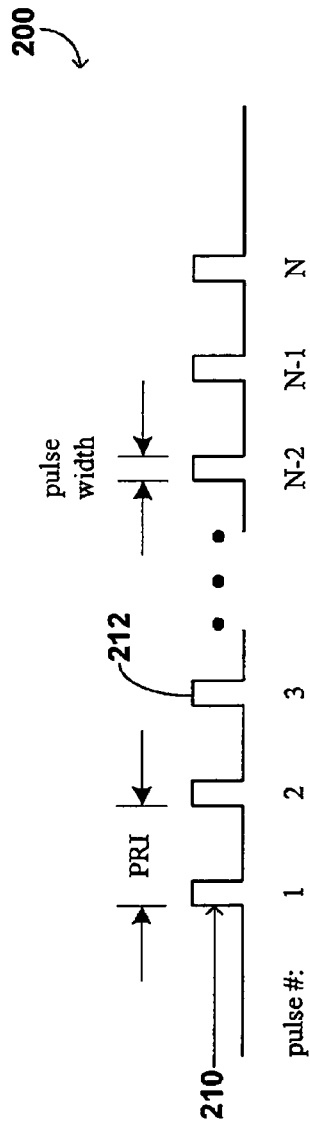
FIG. 2A is a signal diagram of a signal input to the radar detection system in FIG. 1 showing a series of pulses with a pulse repetition interval ("PRI") and a pulse width.

The union of the FCC, ETSI, and Japan DFS documents specifies 4 time-invariant waveforms with fixed parameters. These parameters are listed in Table 1. FIG. 2A is a signal diagram 200 showing example pulses 210 that form a time-invariant waveform 212 having fixed parameters at each of the four specified waveforms. The parameters specified are the pulse width and the PRI, which are shown in the signal in FIG. 2A. In an example of a radar detection system 110 (shown in FIG. 1), a radar signal is detected if the radar detection system 110 detects a signal having a pulse width and a corresponding PRI.

TABLE 1

| Waveform Parameters | | | |
| --- | --- | --- | --- |
| Pulse Width ($\mu$sec) | PRI ($\mu$sec) | Pulses per Burst | DFS Spec |
| 1 | 555 | 10 | ETSI |
| 1 | 1428 | 18 | FCC, ETSI, Japan |
| 2 | 3030 | 70 | ETSI |
| 2.5 | 3846 | 18 | Japan |

Figure 2B:
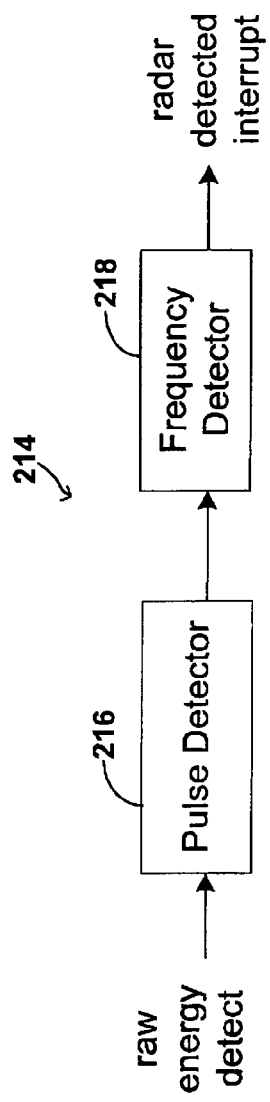
FIG. 2B is a block diagram of an example of a radar detection system for detecting radar signals having a first waveform type.

In one example, a radar detection system 214 for detecting the waveforms in Table 1 includes a pulse detector 216 followed by a frequency detector 218 as shown in FIG. 2B. The pulse detector 216 detects whether a pulse on the raw energy detect input signal is within a range of, or within a range defined by a set of, particular pulse width limits. The pulse width limits may be selected to allow the pulse detector 216 to detect pulse widths across the full range of possible values shown in Table 1. For example, the pulse width detector 216 may detect pulses that have a pulse width between 1 and 2.5 $\mu$sec. The frequency detector 218 may operate with a 40 $\mu$sec clock period.

Figure 2C:
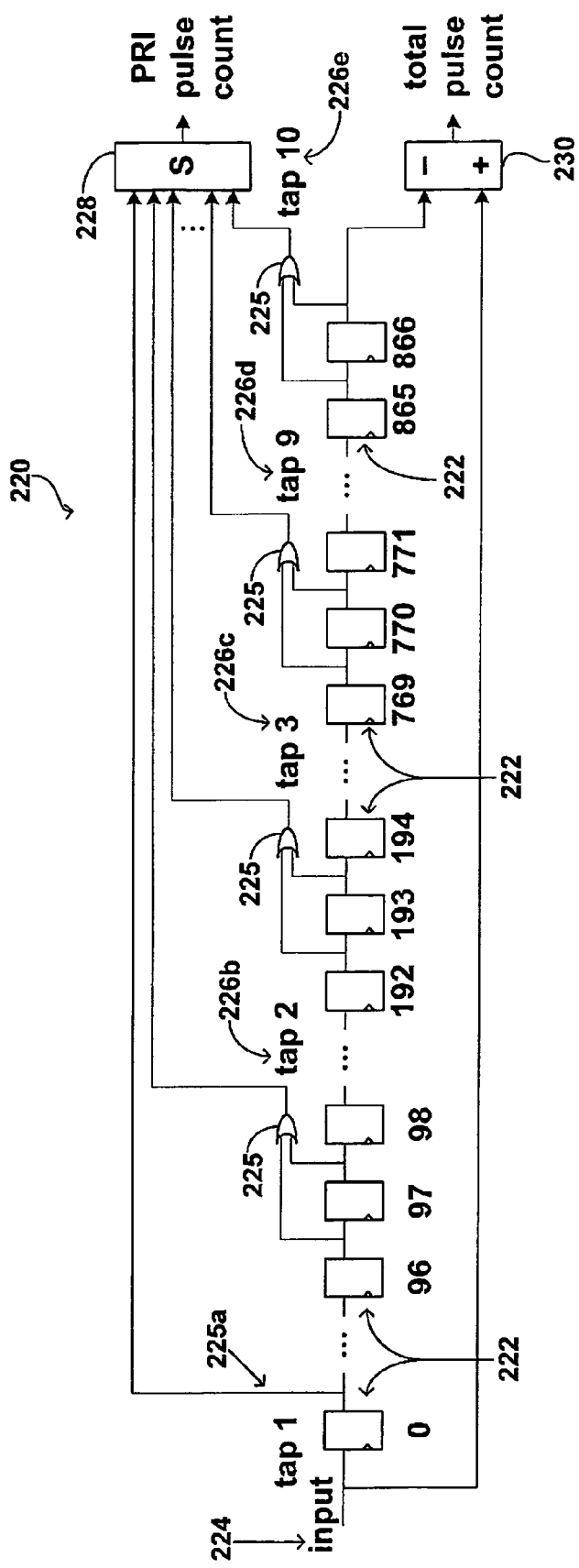
FIG. 2C is a digital logic diagram for an example of a frequency detector that may be implemented in the radar detection system in FIG. 2B.

An example frequency detector 218 implemented largely with hardware components may include logic consisting of a shift register with multiple equidistant taps that are used to detect the presence of the PRI of interest. FIG. 2C is a digital logic diagram for an example of a frequency detector 220 that may be implemented in the radar detection system in FIG. 2B. The frequency detector 220 in FIG. 2C includes a series of shift registers 222, each register having a number of bits, connected to one another to form a single shift register. The series of shift registers 222 shifts an input signal 224 enough times so that the series of shift registers 222 can contain a desired number of pulses greater than the number of pulses needed to detect pulses having the highest PRI. A common clock signal (not shown) is supplied to all of the individual shift registers in the series of shift registers 222 to shift the bits from the input signal 224 at a given shift rate.

Example implementations described here with reference to FIGS. 2A-2E implement a shift register as a bit sequence storage device. However, other storage devices may be used as well, such as memory devices and other types of registers known in the art.

The input signal 224 may be an output from the pulse detector 216 (in FIG. 2B) that would be input to the frequency detector 218 as a stream of bits. In the example in FIG. 2C, the input signal 224 may be at a '1' or high state to indicate that a valid pulse with a pulse width within the ranges specified in Table 1 at a given time. A '0' or low state may be defined to indicate that at the given time, no pulse having the requisite pulse width was found. The PRI and/or pulse width of each bit may be the same as the PRI and/or pulse width of the detected pulse.

The shift register 222 includes a set of taps 226 connected to selected shift register outputs in the series of shift registers 222. All of the taps 226, except for the first tap 226a, are coupled to a logical OR gate 225. Each OR gate 225 receives outputs from two consecutive bits at the selected tap. The OR gates 225 compensate for the tap selection uncertainty caused by the fact that the PRI is generally not evenly divisible by the shift register clock period. The taps 226 are locations in the shift registers 222 that are wave-form indicating. For each PRI value being tested for, a set of taps are expected to be set to the value indicative of a pulse (e.g. a '1' in the illustrated example).

The taps 226 output a signal indicative of the presence of a pulse at the location of each tap 226. For example, a '1' level at tap bit 1 226a, tap bit 2 226b, and tap bit 3 226c, may indicate that a radar waveform having specified characteristics (e.g. pulse widths and PRIs in Table 1) is being shifted through the shift register 222. Similarly, a '0' level at the other tap bits 226d may indicate that the waveform having the specified characteristics is not present. The outputs of each of the taps 226 are connected to an adder 228, which generates a sum of all of the taps 226 at each shift register clock period. The sum for the example in FIG. 2C represents a PRI pulse count, which may be compared to a threshold PRI pulse count. If the PRI pulse count exceeds the threshold, the presence of a radar signal may be indicated.

The example in FIG. 2C may be implemented using primarily hardware such as one or more Xilinx™ field-programmable gate arrays (FPGA) that may include a series of 1-bit shift register that can be mapped into a single Look-Up Table (LUT) in the device. The example frequency detector 218 in FIG. 2C includes a clock (not shown) to provide a shift rate that may be selected to be 25 kHz and the length of the shift register 222 is selected to be sufficiently long to fully contain 10 consecutive pulses for the highest PRI shown in Table 1 (3846 μsec). The example may also implement the shift register 222 as 867 1-bit registers mapped into a group of look-up tables. Each LUT may also include one 16-bit shift register, which would result in ~55 LUTs. Ten (10) tap points may be chosen in the shift register 222 that correspond to the bits that would be set if a radar signal of the correct PRI were injected into the frequency detector. With the exception of the first tap point, each tap point is actually a logical-OR of 2 adjacent registers in the chain.

FIG. 2C provides a logic diagram for an example that detects the 3846 μsec PRI waveform. Only five of the ten taps 226 and only a portion of the complete LUT are shown in FIG. 2C. The first tap at tap 1 226a is located at the first shift register 0 222; the second tap at tap 2 226b is located at shift registers 96 and 97; the third tap tap 3 226c is located at shift registers 192 and 193; the ninth tap is located at shift registers 769 and 770; and the tenth tap is located at the outputs of the last two shift registers 865 and 866. The locations of all ten taps (after the first tap location, which is at the output of the first shift register) may be determined from the following logic formula:

wire[9:0]taps__3846={(sreg[865]|sreg[866]),(sreg[769]|sreg[770]),(sreg[673]|sreg[674]),(sreg[576]|sreg[577]),(sreg[480]|sreg[481]),(sreg[384]|sreg[385]),(sreg[288]|sreg[289]),(sreg[192]|sreg[193]),(sreg[96]|sreg[97]),(sreg[0])}. (Equation 1)

where "|"=logical OR, and sreg[n] is a shift register at location n in a set of shift registers connected in series starting with shift register sreg[0].

In implementations operating in the field, the raw energy detect signal may contain noisy bursts of pulses that are unrelated to a radar signal but may still be flagged as valid pulses that end up injected into the shift register 222. This may cause radar detection false alarms to occur. To help prevent these false alarms, a total pulse counter 230 is included to track of the total number of bits that are set in the shift register 222. If the total pulse counter 230 exceeds a programmable excessive bit threshold, the radar detection output signal is gated off.

Figure 2D:
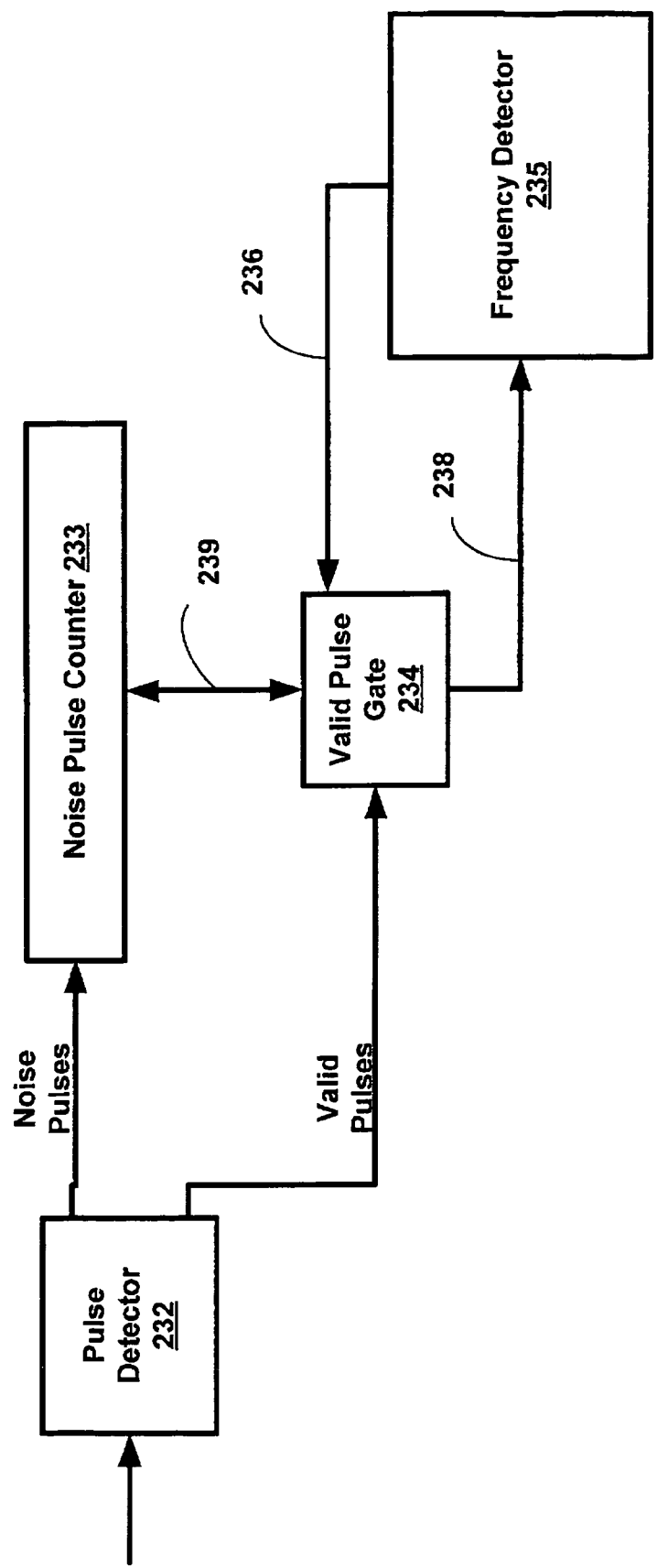
FIG. 2D is a block diagram of an example implementation of a pulse detector and noise counter that may be implemented in the radar detection system in FIG. 2B.

FIG. 2D is a block diagram of an example implementation of a pulse detector 232 and a noise counter 233 that may be implemented in the radar detection system in FIG. 2B. The pulse detector 232 may operate as described above with reference to the pulse detector 216 in FIG. 2B, except that the pulse detector 232 in FIG. 2D outputs either a valid pulse indicative of a pulse received within the maximum and minimum pulse width limits, or a noise pulse if the pulse received is from noise signals. The pulse detector 232 may determine that any pulse received that does not qualify as a valid pulse is a noise pulse. The pulse detector 232 may determine that a pulse is valid by verifying that the pulse width is within the minimum and maximum pulse width limits. Valid pulses are coupled to a valid pulse gate 234 and the noise pulses are coupled to the noise pulse counter 233.

In one example, the noise pulse counter 233 maintains a running count of the noise pulses received. The number of pulses received may be compared to a noise pulse threshold. If the number of pulses exceeds the noise pulse threshold, the pulse detector 232 may be prevented from passing valid pulses to the frequency detector 235. In another example, valid pulses are passed to the frequency detector 235, but indication of the detection of a radar signal may be disabled when the noise pulse threshold is exceeded. For example, the noise pulse counter 233 may be configured to gate 'OFF' the radar detection signal. Gating off the radar detection signal may be done by a valid pulse gate 234. The pulse gate may also include logic that detects the number of pulses in time segments and exchange signals with the noise pulse counter 233 at 239. For example, if multiple pulses are found in one 40 usec segment, a 'one' value is not shifted into the shift register. Instead, the noise pulse counter 233 is incremented. The valid pulse gate 234 may also receive signals from the frequency detector 235 to determine whether there are any valid bits in the shift register at all. If there are no valid bits in the shift register, the valid pulse gate 234 may send a signal to the noise pulse counter 23 to force its contents to 0.

In another example of handling pulses that do not fit the criteria of a valid pulse, a parallel shift register may be included to receive pulses that indicate invalid pulses. The parallel shift register would receive invalid pulses in parallel with the valid pulses being input to the shift register. At the point of shifting, the pulse is evaluated as noise or valid pulse. If the pulse is valid, it is shifted into the valid pulse shift register, and if noise, it is shifted in the noise shift register. One of ordinary skill in the art will appreciate that the use of parallel shift registers or an additional noise counter are described as examples of how noise pulses may be handled. Other examples are possible as well.

Figure 2E:
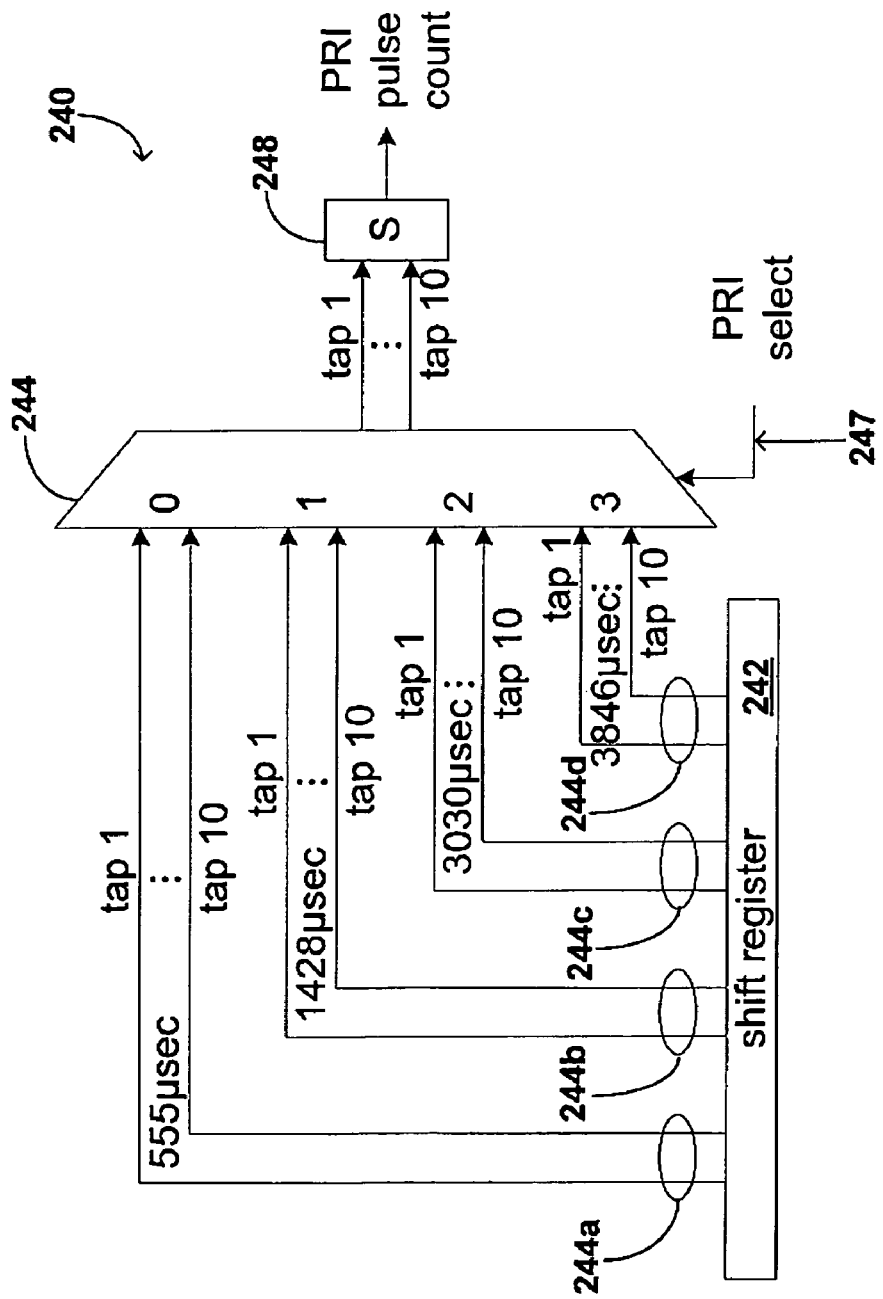
FIG. 2E is a digital logic diagram for another example of a frequency detector that may be implemented in the radar detection system in FIG. 2B.

The frequency detector 220 in FIG. 2C is configured to detect the 3846 μsec PRI waveform (see Table 1). FIG. 2E is a digital logic diagram of another example of a frequency detector 240 that enables detection of all four (4) PRI values in Table 1 by the inclusion of 3 more sets of 10 taps (in addition to the 10 taps described above for the 3846 μsec PRI waveform) to a shift register 242. FIG. 2D shows:

1. a first set of tap outputs 244a for taps included to detect the 555 μsec PRI waveform;
2. a second set of tap outputs 244b for taps included to detect the 1428 μsec PRI waveform;
3. a third set of tap outputs 244c for taps included to detect the 3030 μsec PRI waveform; and
4. a fourth set of tap outputs 244d for taps included to detect the 3846 μsec PRI waveform.

The shift register 242 may include bit locations for all of the bits in the longest one of the PRI cycles, which is the 3846 μsec PRI waveform in the illustrated example. In the example in FIG. 2D, the shift register 242 includes about 900 bit locations, which is sufficient to contain shift registers to detect any of the other three PRI waveforms. The taps to detect any of the four PRI waveforms may be inserted in the appropriate locations in the shift register 242.

The location of each of the sets of taps may be determined for each of the PRI values according to a logic equation. The locations of the taps for detecting the 555 μsec PRI waveform may be determined from the following equation:

wire[9:0]taps__555={(sreg[124]|sreg[125]),(sreg[111]
|sreg[112]),(sreg[97]|sreg[98]),(sreg[83]|sreg
[84]), (sreg[69]|sreg[70]),(sreg[55]|sreg[56]),
(sreg[41]|sreg[42]),(sreg[27]|sreg[28]),(sreg[13]
|sreg[14]), (sreg[0])}.     (Equation 2)

The locations of the taps for detecting the 1428 μsec PRI waveform may be determined from the following equation:

wire[9:0]taps__1428={(sreg[321]|sreg[322]),(sreg
[285]|sreg[286]),(sreg[249]|sreg[250]),(sreg[214]
|sreg[215]),(sreg[178]|sreg[179]),(sreg[142]|sreg
[143]),(sreg[107]|sreg[108]),(sreg[71]|sreg[72]),
(sreg[35]|sreg[36]),(sreg[0])}.     (Equation 3)

The locations of the taps for detecting the 3030 μsec PRI waveform may be determined from the following equation:

wire[9:0]taps__3030={(sreg[681]|sreg[682]),(sreg
[606]|sreg[607]),(sreg[530]|sreg[531]),(sreg[454]
|sreg[455]),(sreg[378]|sreg[379]),(sreg[303]|sreg
[304]),(sreg[227]|sreg[228]),(sreg[151]|sreg
[152]),(sreg[75]|sreg[76]),(sreg[0])}.     (Equation 4)

The locations of the taps for detecting the 3846 μsec PRI waveform may be determined from the following equation, which is the same as Equation 1:

wire[9:0]taps__3846={(sreg[865]|sreg[866]),(sreg
[769]|sreg[770]),(sreg[673]|sreg[674]),(sreg[576]
|sreg[577]),(sreg[480]|sreg[481]),(sreg[384]|sreg
[385]),(sreg[288]|sreg[289]),(sreg[192]|sreg
[193]),(sreg[96]|sreg[97]),(sreg[0])}.     (Equation 5)

The outputs of the 4 sets of 10 taps may be connected to a multiplexer 246 having four ten-line channels selectable by a PRI waveform select signal 247. In one example implementation, a 0-3 counter may be connected to the PRI waveform select signal 247 and triggered to count up from 0 to 3 (or down from 3 to 0) to repeatedly cycle through the ten-line channels. The counter may be triggered by a clock signal. In the illustrated example, a 40 μsec clock is coupled to the counter. At each of the 0 to 3 count steps, the signals at the selected set of 10 taps are latched in the multiplexer 246. The multiplexer 246 couples the signals at the latched taps to the ten-line channel output. The signals at the ten-line channel output are read to determine the presence of a specific PRI waveform. The ten-line channel selected by the PRI waveform select signal 247 may also be coupled to a PRI pulse counter 248 as shown in FIG. 2E.

The example frequency detector 240 in FIG. 2E enables detection of all 4 PRI values in Table 1 using the single shift register 242. When the PRI waveform select signal is asserted, the 10 taps from the selected PRI get multiplexed into the PRI pulse counter 248. The pulse counter 248 may be incremented by the number of lines set to a '1' value when the 10 tap values for the given PRI waveform are latched at the multiplexer 244. A function (not shown) may be implemented to check the pulse count for each PRI waveform by comparing it to a threshold value that would indicate that a radar signal is detected. For example, at a given PRI waveform, a value of 8 out of the ten taps set at a '1' value may be sufficient to denote that a radar signal has been detected. The function may then trigger a signal indicating that radar was detected when the PRI pulse counter 248 has reached or exceeded the threshold (8 in this example).

2. Detection of Radar Having a Time-Invariant Waveform with a Range of Parameters The FCC DFS document specifies 3 time-invariant waveforms with a range of parameters as shown in Table 2. The parameters that may be specified as a range of values include the pulse width, the PRI, and the number of pulses per burst. In example radar detection systems consistent with the present invention, analysis of the raw energy detect signal includes detecting pulses having pulse widths between one of a selected set of pulse width ranges; detecting PRI's within selected ranges; and detecting a number of pulses in a pulse burst that falls within a selected range.

TABLE 2

| Waveform Parameters | | | |
|---|---|---|---|
| Pulse Width (μsec) | PRI (μsec) | Pulses per Burst | DFS Spec |
| 1-5 | 150-230 | 23-29 | FCC |
| 6-10 | 200-500 | 16-18 | FCC |
| 11-20 | 200-500 | 12-16 | FCC |

Figure 3A:
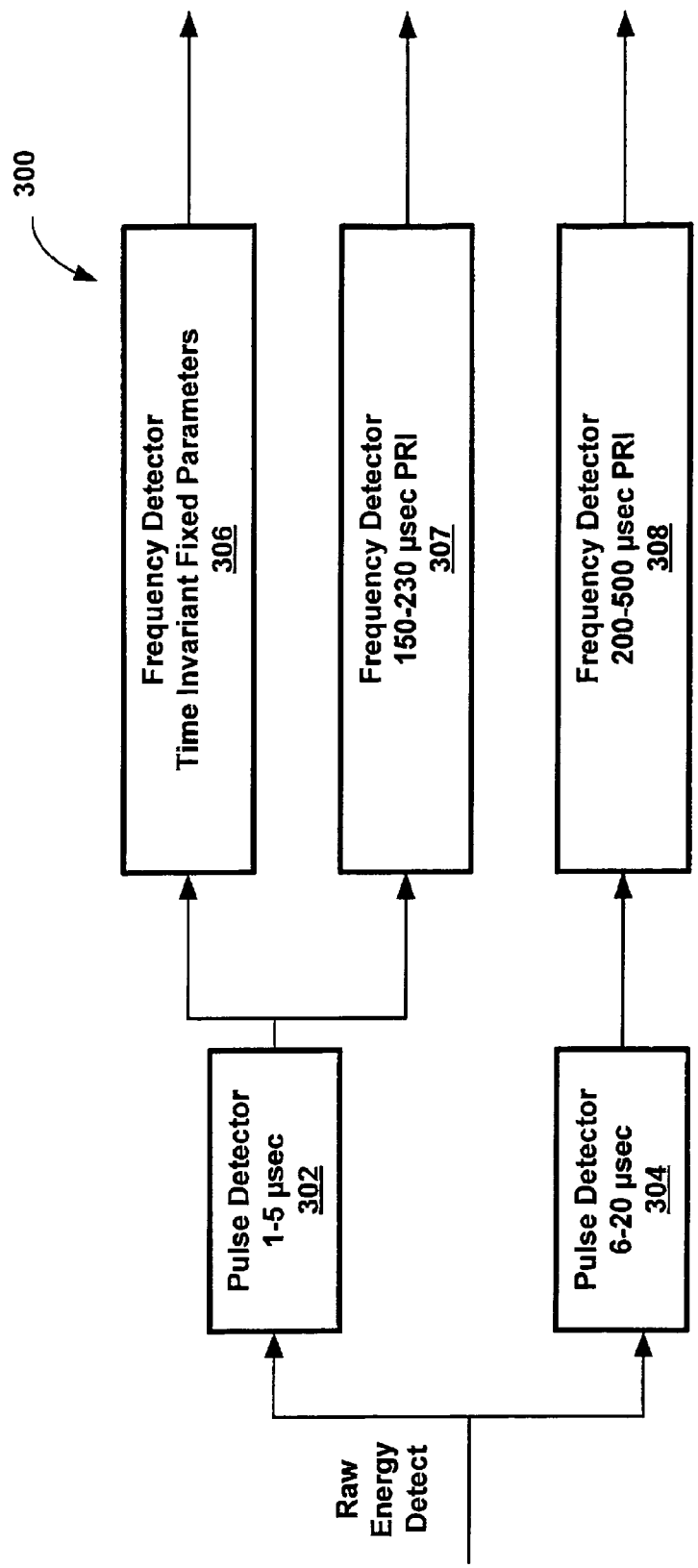
FIG. 3A is a block diagram of another example of a radar detection system for detecting radar signals having a second waveform type.

FIG. 3A is a block diagram of an example of a radar detection system 300 for detecting radar signals. The system 300 in FIG. 3A may be used to detect radar signals having the first waveform type, which may be a time invariant waveform with constant parameters (as described above), and a second waveform type, which may be a time invariant waveform with parameters specified in ranges. The frequency detector 300 in FIG. 3A includes a first pulse detector 302, a second pulse detector 304, a first frequency detector 306, a second frequency detector 307, and a third frequency detector 308. The first pulse detector 302 may be of a similar, or same, structure as the pulse detector 216 described above with reference to FIG. 2B. The first pulse width detector 302 may be configured to detect pulses having pulse widths between 1 and 5 μsec, which is the pulse width for waveforms defined by Table 1 and the first line in Table 2. The output of the first pulse width detector 302 may be coupled to the first frequency detector 306 and to the second frequency detector 307. The first frequency detector 306 may be configured as described above with reference to FIGS. 2C-2E to detect time invariant waveforms with fixed parameters as defined in Table 1. The first frequency detector 306 provides versatility enabling the system to be used to detect radar under more than one standard.

The second frequency detector 307 may be configured as described below with reference to FIG. 3B to detect time-invariant waveforms with range of parameters specified in the second and third lines of Table 2. The second pulse width detector 304 in FIG. 3A may detect pulses with pulse widths between 6 and 20 μsec. The second pulse detector 304 is coupled to the third frequency detector 308, which detects time-invariant waveforms with a PRI in the range of 200-500 μsec. The third frequency detector 308 may be configured as described below with reference to FIG. 3C to detect time-invariant waveforms with range parameters specified in the first line of Table 2.

The first, second, and third frequency detectors 306, 307, 308 may operate with a 10 μsec clock period. If multiple pulses are detected during a 10 μsec span, they are treated as noise.

Those of ordinary skill in the art will appreciate that the radar detection system 300 in FIG. 3A is one example implementation and others may be used. In other implementations, a single pulse detector covering the range of 1 to 20 usecs (with multiple outputs) may be used. Another implementation may use separate pulse detectors for the 1-5, 6-10, 11-20 μsec ranges. In another implementation, each pulse detector may be connected to a frequency detector configured to detect a specific waveform. In another implementation, a radar detection system may include a first frequency detector, such as the frequency detector described above with reference to FIG. 2C, to detect time invariant waveforms with fixed parameters, and a second frequency detector to detect time invariant waveforms with ranges of parameters as described below with reference to FIGS. 3B and 3C.

In the illustrated example, the second and third frequency detectors 307 and 308 in FIG. 3A may implement one or more shift registers similar to the frequency detector 218 described above with reference to FIG. 2B. The second and third frequency detectors 307 and 308 may allow access to the output of each shift register in the series of shift registers instead of a few fixed locations. By allowing such access, the frequency detector 304 may scan for any PRI that falls within a range defined by the minimum and maximum PRI values in Table 2 (i.e., 150-500 μsec) according to a scan interval. In the example shown in FIG. 3B for an implementation to detect waveforms that conform to the parameters specified in Table 2, a scan interval of 10 μsec (the shift rate) is selected.

Figure 3B:
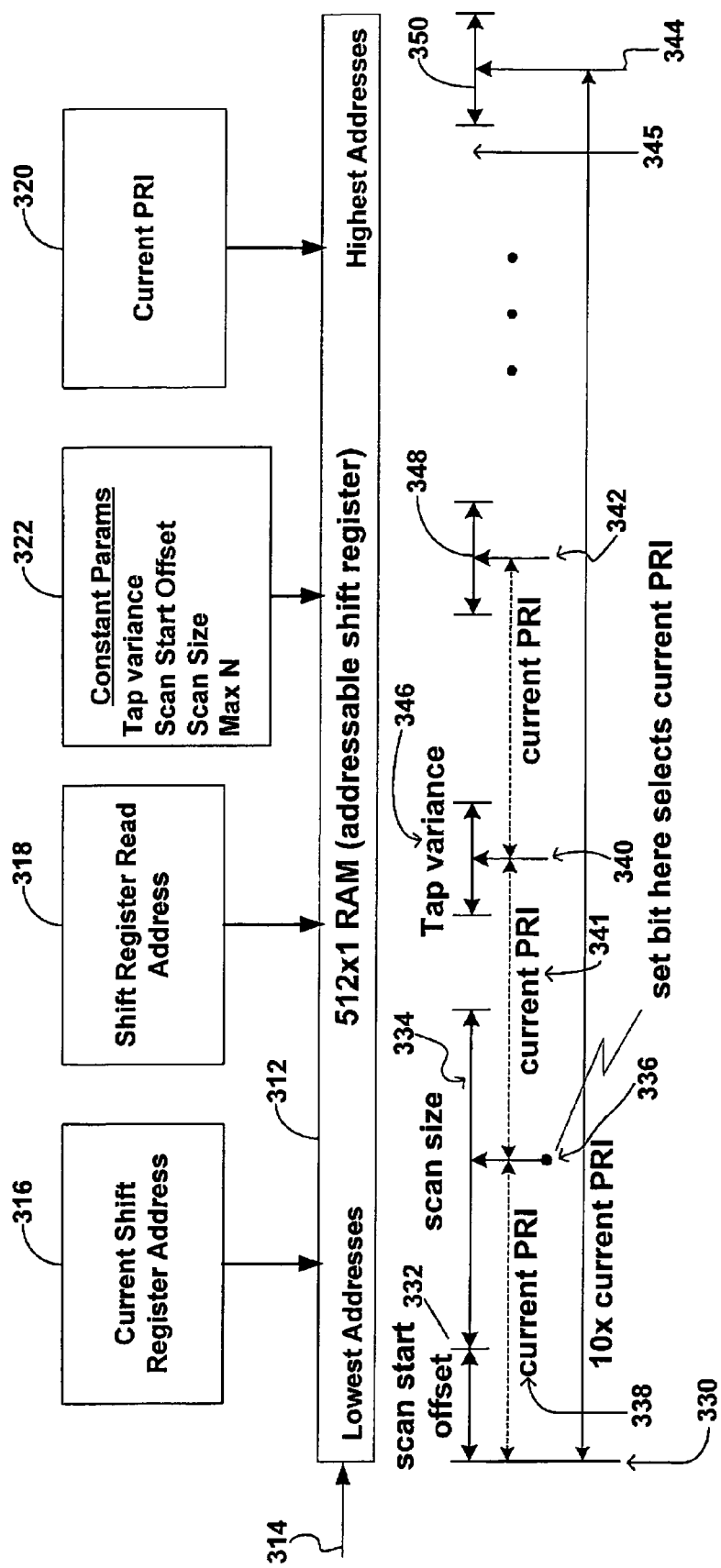
FIG. 3B is a schematic diagram depicting operation of an example of a frequency detector that may be used in the radar detection system of FIG. 3A.

FIG. 3B is a schematic diagram depicting operation of an example of a frequency detector 310 that may be used in the radar detection system 300 of FIG. 3A. The frequency detector 310 in FIG. 3B includes a single bit addressable random access memory ("RAM") 312 for receiving and shifting an input signal 314 in a manner similar to that of the series of shift registers 218 described above with reference to FIG. 2C. The single-bit addressable RAM 312 in FIG. 3B has waveform-indicating locations that are not at fixed locations. The PRI parameters in Table 2 are specified in ranges. The single bit addressable RAM 312 makes each bit accessible for analysis by scanning the bits to determine the time separation between the bits and checking if the ranges of the specified parameters are met.

The frequency detector 310 in FIG. 3B implements a single-bit addressable RAM 312, however, any bit sequence storage device may be used as well. Other examples include shift registers and other types of registers known in the art for use as bit sequence storage devices.

The single bit addressable RAM 312 in FIG. 3B contains 512 single bit locations. The 512 single bit addressable RAM 312 is selected to have 512 locations because 512 multiplied by 10 μsec (i.e. the scan interval) is 5.12 msec, which provides the single bit addressable RAM 312 with sufficient storage space to hold 10 pulses at the maximum PRI of 500 μsec (see Table 2). For waveforms that conform to different sets of parameters, a different scan interval and size RAM may be selected.

In the frequency detector 310 in FIG. 3B, a process for detecting a waveform as specified in Table 2 may be implemented by periodically writing each bit output from the pulse detector 302 to the bit addressable RAM 312. The bit output is written to the single bit addressable RAM 312 at each time period determined by the scan interval. In the example in FIG. 3B, the output from the pulse detector 302 is written to the single bit addressable RAM 312 every 10 μsec. The first bit to be processed is stored in the highest address RAM location. As each bit is stored in a RAM location, the current shift register address register is decremented so that the newest bits are stored in lower RAM addresses. When a bit is stored in address 0, the next RAM location for storing a bit is the highest address RAM location. Bits are then added from highest address to lowest address.

The frequency detector 310 in FIG. 3B may also include several registers that may be used to assist operation of a PRI scan. A current shift register address 316 may be used to store an address for the next location of the single bit addressable RAM 312 in which the next bit will be written. A read address register 318 may be used to contain the next location of the single bit addressable RAM 312 to be read or accessed to determine whether it contains a PRI bit. The number in the current PRI register 320 multiplied by 10 μsec should be within one of the PRI ranges specified in Table 2. A set of parameters 322 may also be defined for use during a PRI scan. The set of parameters 322 include:

1. MAX_N—a threshold number of PRI pulses determined to be sufficient to identify a valid waveform;
2. SCAN_START_OFFSET—an offset from the current shift register address 316 at which the PRI scan is started;
3. TAP_VARIANCE—an error in the number of bit addresses between PRI pulses; and
4. SCAN_SIZE—a number of single bit addressable RAM 312 locations to be checked during the PRI scan.

In the example shown in FIG. 3B, MAX_N is set to 10. The SCAN_START_OFFSET is a number of RAM 312 locations that corresponds with the smallest PRI value specified in Table 2. The SCAN_START_OFFSET+SCAN_SIZE is a number of RAM 312 locations that corresponds with the largest PRI value specified in Table 2.

If an output bit from the pulse detector 302 indicates that a pulse having a pulse width within the ranges in Table 2, was detected during the last 10 μsec interval, the single bit addressable RAM 312 is scanned for PRIs. In FIG. 3B, the single bit addressable RAM 312 is almost full and the bit last written to the RAM 312 indicates that a valid pulse width was found and written to a location that is close to the lowest address at 330. Those of ordinary skill in the art will appreciate that FIG. 3B illustrates a representative state of single-bit addressable RAM 312 for purposes of explaining operation of an example implementation. Those of ordinary skill in the art will also appreciate that at any time, the next location to add a bit may be anywhere in the single-bit addressable RAM 312.

It may be assumed for purposes of illustration in the example in FIG. 3B that a pulse has been found, but the length of the PRI is not known and a location of a previously received pulse in the single bit addressable RAM 312 is not known. Because the length of the PRI is not known, the scan begins to search for a previously received pulse at a location in the single bit addressable RAM 312 that would correspond to the location of a previously received pulse if the PRI is the minimum PRI value. The scan would then proceed to the location that corresponds with the maximum PRI value. The scan is initiated by adding the current shift register address 316+ SCAN_START_OFFSET and storing the sum in the RAM read address register 318. In the example illustrated in FIG. 3B, this location corresponds to the minimum PRI value of 150 μsec specified in Table 2 because the SCAN_START_OFFSET value is set to the number of locations from the current shift register address 316 at which another pulse may be found if the PRI value is at the minimum value specified in Table 2. The scan start point for an example PRI scan is shown in FIG. 3B at 332. If the bit at this location is not set, each successive bit will be tested for a set bit until the RAM read address register equals the current shift register address 316+SCAN_START_OFFSET+SCAN_SIZE. This location corresponds to the maximum PRI value of 500 μsec shown in Table 2. The length of the RAM 312 that is scanned in the example shown in FIG. 3B is at 334.

If a set bit is encountered during the scan, the difference between the RAM read address register 318 and the current shift register address 316 is stored as the current PRI value in the current PRI register 320. The current PRI is the PRI value that will be tested for the presence of a radar signal. FIG. 3B shows a point at 336 where a previously received bit is found during the scan at 334. The current PRI for the example is indicated at 338.

At this point, 2 pulses at the current PRI have been detected (the pulse that initiated the PRI scan at 330 and the previously received pulse found during the PRI scan at 336). The single bit RAM 312 will now be scanned for additional previously received pulses at the current PRI. A total of 8 single bit addressable RAM 312 locations that are N×current PRI (where N=2 to 9) away from the current shift register address 316 will be tested for set bits (the presence of pulses). If all 10 locations have a set bit then 10 pulses at the current PRI have been detected. FIG. 3B shows some of the N×current PRI locations at 340, 342, 344 separated by corresponding current PRI segments of locations at 341, 343, 345.

In the example shown in FIG. 3B, the RAM locations at N×current PRI away from the current shift register address 316 are tested using a small scan to account for any rounding errors that may occur. The small scan may be performed at each of the additional 8 RAM locations with a size of TAP_VARIANCE on both sides of the center point of each of the 8 locations. Examples of locations where the small scan may be performed are shown in FIG. 3B at 346, 348, 350.

The example PRI scan described above with reference to FIG. 3B is only one example for detecting bits from a radar waveform. The PRI scan may be implemented in other ways. For example, in some environments, an error may result in an early current PRI determination that grows as the scan progresses if the current PRI value is not changed. In another example of a PRI scan, a radar waveform may be received and stored in the single-bit addressable RAM 314. A scan may be performed to determine a first delta (i.e. number of addresses) between the first pair of set bits in the radar waveform. The scan is started and the number of addresses traversed is identified as a first delta. For purposes of illustration, the delta may be assumed to be 20. The current PRI is set to the delta (i.e. 20). The expected location of the next bit may be determined by multiplying the current PRI by 2 and adding it to the current shift address register 316 (address from which the scan is started). A focused scan is performed around the expected location of the next bit by testing locations within a predetermined variance around the expected location of the next bit. The next bit in memory should be located within the variance.

When the next bit is located, the number of addresses between the next bit and the first set bit is determined as a second delta. The second delta may be different from the first delta, each delta being an approximate distance to the next waveform-indicating location in the single-bit addressable RAM. For purposes of illustration, assume the second delta is 21. The current PRI is set to this second delta and used to perform another focused scan around the expected location of the next previously received bit by adding the new current PRI value to the location of the latest detected bit. Each successive bit in the single-bit RAM 312 is searched for using this focused search by updating the current PRI each time. It is possible that radar burst and packet arrive at the same time wiping out the radar bit. In this scheme, there would be a missing bit and a new delta would not be available. If a bit is not located in the focused scan, one may be assumed at a location using the original current PRI value and used to search for the next bit.

The number of pulses detected at the current PRI may be compared to a programmable radar detection threshold. If the threshold is exceeded, an indication that radar was detected is provided to components in the wireless communications systems device that are responsible for providing control (such as a microprocessor executing software). If radar is not detected at the current PRI, the scan for a valid PRI continues where it left off in the SCAN_SIZE window at 336) shown in FIG. 3B. Continuing the PRI scan enables testing for multiple PRI values. In some example implementations, the number of PRI values that can be tested may be limited by the length of the 10 μsec shift register clock period. Assuming a system clock of 66 MHz, there are a total of 660 clocks available. The number of clocks needed to test a specific number of PRI values can be calculated based on the settings for SCAN_START_OFFSET, SCAN_SIZE, and TAP_VARIANCE. These parameters permit determination of a programmable value may be set for the maximum number of PRI values to be tested.

In some environments, the possibility of detecting false radar signals may be a particular problem. The system shown in FIG. 3B may include a false radar detection function to reduce the likelihood that false radar signals will be detected. Example systems may implement the pulse detector 232 and noise pulse counter 233 described above with reference to FIG. 2D to reduce the effect of detecting false radar signals. Other schemes may be used as well.

Figure 3C:
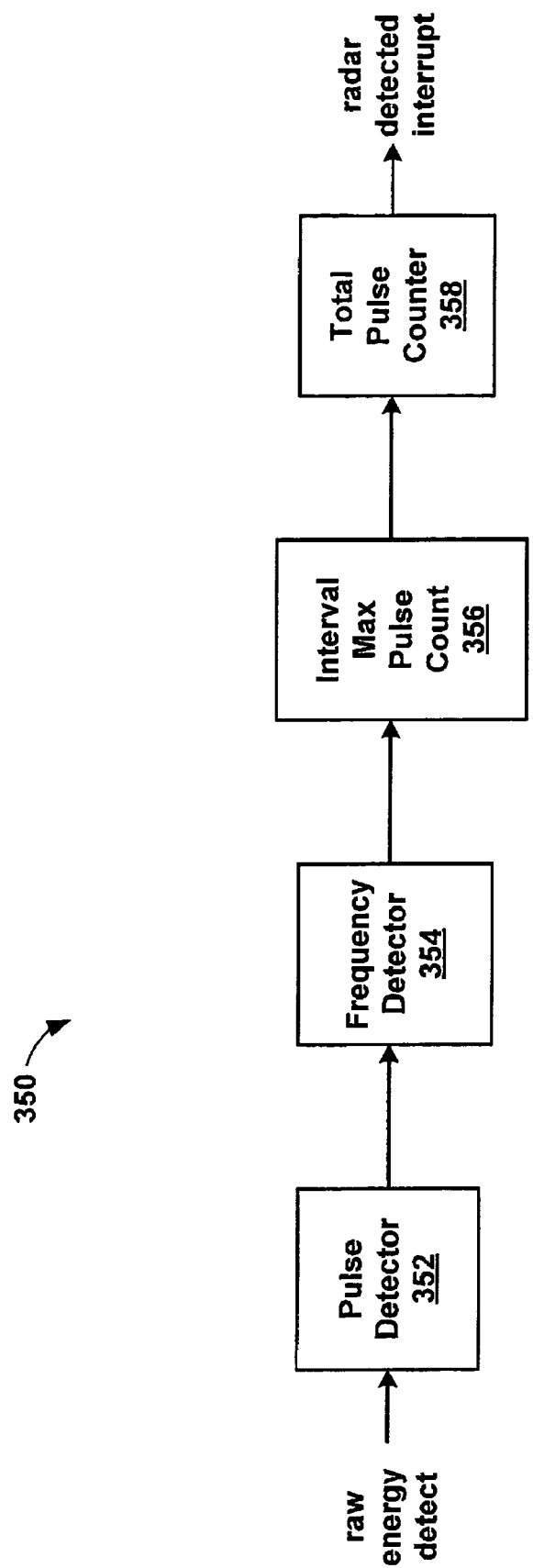
FIG. 3C is a block diagram of another example of a frequency detector for detecting radar waveforms having a time-invariant waveform with a range of parameters.

FIG. 3C is a block diagram of a radar detection system 350 using another example of a frequency detector for detecting radar waveforms having a time-invariant waveform with a range of parameters. The example in FIG. 3C may be used to process waveforms having pulse widths of 1-5 μsecs as specified in Table 2 above. The radar detection system 350 includes a pulse detector 352, a frequency detector 354, an interval maximum pulse counter 356, and a total pulse counter 358. One particular advantage of the radar detection system 350 in FIG. 3C is that it requires substantially less memory space.

The pulse detector 352 may be used to detect pulses having a pulse width, in the illustrated example, of 1-5 μsecs. The pulse detector 352 may operate in a manner similar to the pulse detectors described above.

The frequency detector 354 may operate similar to the frequency detector 300 described above with reference to FIG. 3B. The frequency detector 354 does not however contain enough storage to contain the maximum radar waveform time interval. Every 10 μsec, the output of the pulse detector 352 is shifted into the frequency detector 354, which conducts a search for a PRI in the specified min/max range. The frequency detector 354 keeps a count of the maximum number of pulses for specific PRI values found across all searches in the interval maximum pulse counter 356. At a predetermined time interval, the value of the maximum number of pulses in the interval maximum pulse counter 356 is shifted into the total pulse counter 358. The total pulse counter 358 includes an 8-slot shift register for storing the pulse counts in the last 8 predetermined time intervals. All of the shift registers in the frequency detector 354 are then cleared along with the interval maximum pulse counter. In an example used for detecting radar signals defined by Table 2, a predetermined time interval may be set to 1280 μsec.

In addition, at the same predetermined time interval (i.e. every 1280 μsec), the pulse count values in all 8 shift register slots are summed to arrive at a total PRI pulse count value. If this total PRI pulse count value exceeds a programmable threshold of PRI pulses indicative of radar signals, a radar-detected indication is generated.

In some environments, conditions may create the likelihood that false radar signals will be detected. In an example implementation, a feature to prevent radar false detection in environments may be included. Such a feature may be implemented in for the example in FIG. 3C as follows. Both the total number of pulses within the min/max pulse width limits (valid pulses) and the total number of pulses outside of the min/max limits (invalid pulses) may be separately tracked during each 1280 μsec interval. If more than a single pulse is detected by the pulse detector during any 10 μsec interval, this will be counted as a single invalid pulse instead of a valid pulse. A distinct limit or threshold number may be provided for the valid total pulse count and for an invalid pulse count.

If either of the two pulse counts (i.e. valid total pulse count and invalid total pulse count) exceeds a preset respective limit, a flag will be set. At the end of each 1280 μsec interval, this flag value will be shifted into an 8-slot shift register and then the flag will be cleared. As long as any of these shift register bits is set, a radar detection indication will not be given irrespective of the total pulse count value.

3. Detection of Radar Having a Time-Varying Waveform

Figure 4A:
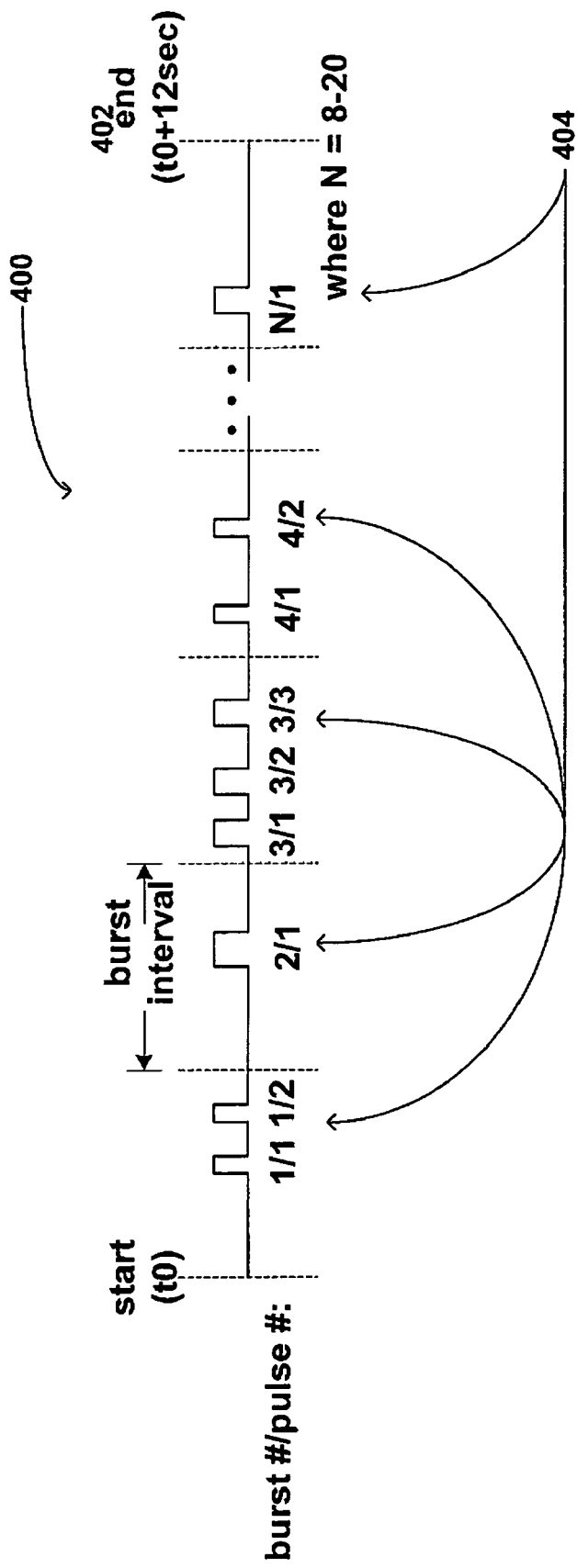
FIG. 4A is a signal diagram of a signal input to the radar detection system in FIG. 1 showing a series of pulses according to a radar signal having a third waveform type.

The FCC DFS document specifies 1 time-varying waveform with a range of parameters as shown in Table 3. An example waveform 400 is shown in FIG. 4A. The waveform 400 is characterized in that:

A total waveform duration of 12 seconds (at 402) is divided into N equal intervals (at 404), where N is the number of pulse bursts.
The characteristics of each burst is randomly generated.
The pulse width is the same for each pulse in a burst.
The period between pulses is different when there are 3 pulses in a burst.
Each bursts starts at a random point in its burst interval.

TABLE 3

Waveform Parameters

| Pulse Width (μsec) | PRI (μsec) | Pulses per Burst | Number of Bursts | Total Duration (sec) | DFS Spec |
|---|---|---|---|---|---|
| 50-100 | 1000-2000 | 1-3 | 8-20 | 12 | FCC |

Figure 4B:
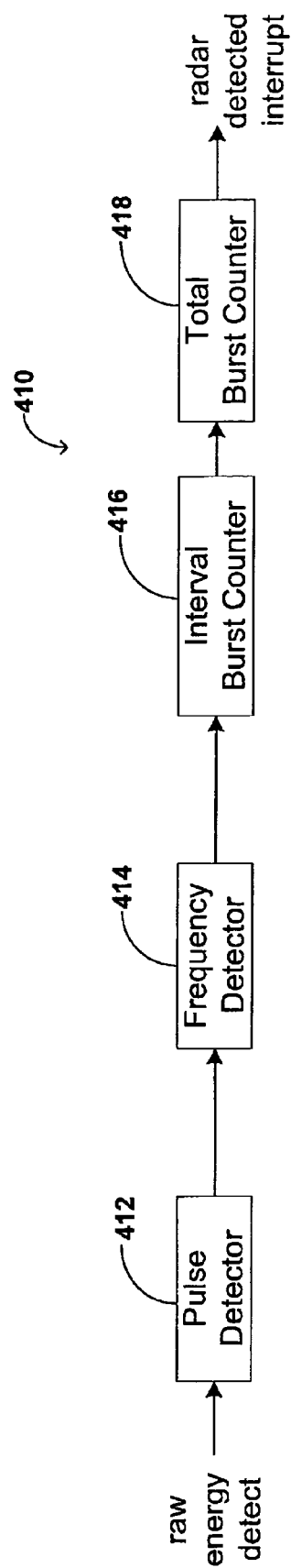
FIG. 4B is a block diagram of another example of a radar detection system for detecting radar signals having the third waveform type.

FIG. 4B is a block diagram of another example of a radar detection system for detecting radar signals having the third waveform type-a time invariant waveform described by parameters in Table 3. The radar detection system 410 includes a pulse detector 412, a frequency detector 414, an interval burst counter 416, and a total burst counter 418. The pulse detector 412 receives a raw energy detect signal and determines if the signal contains a valid pulse. The pulse detector 412 may be similar to the pulse detector 302 described with reference to FIG. 3A, but with pulse width limits set to allow the pulse detector 412 to detect pulse widths across the full range of possible values shown in Table 3 (i.e., 50-100 μsec). The pulse detector 412 in FIG. 4B also divides the range of valid pulse width values into 4 sub-ranges of equal size. Each valid pulse is categorized into one of these sub-ranges and given a value of 0 to 3 corresponding to the selected sub-range. It is to be understood that the implementation described is only an example of a variety of ways to implement the radar detection system for detecting time variant radar waveforms. In addition, parameters such as the number of sub-ranges chosen for categorizing the valid pulses may be any other suitable value.

The frequency detector 414 searches for bits at waveform indicating locations that vary according to the ranges specified for given time-variant waveforms with variable parameters. The frequency detector 414 may receive a clock signal, or other signal, to initiate a search for pulse bursts at a predetermined cycle time. In the example shown in FIG. 4B, a 40 μsec clock period is used, which means that multiple pulses detected during a 40 μsec span may appear as noise. Such pulses may be processed as described above with reference to FIG. 2D.

Every 40 μsec, the frequency detector 414 searches for a 2 pulse burst with a PRI of 1-4 msec. A range of 1-4 msec is used because 4 msec is twice the PRI limit specified in Table 3. Using twice the PRI limit reduces the chance of missing a pulse burst with a missing middle pulse. In the example in FIG. 4B, bursts of 2 pulses with the same pulse width are detected. Single pulse bursts are ignored since they cannot be differentiated from noise. A 3-pulse burst is treated as two 2-pulse bursts.

The number of 2-pulse bursts detected by the frequency detector 414 during a burst interval are counted by the interval burst counter 416. A burst interval is set to the smallest value of 600 msec (12 sec/20) for the parameters in Table 3. If a burst interval other than 600 msec is used to generate the waveform, two 3-pulse bursts may fall into the same 600 msec interval. This will result in a worst case burst count of 5 for that interval. Every 600 msec, a current burst count is loaded into a 20 deep shift register (since 20×600 msec=12 sec) and then the current burst count is reset.

Every 600 msec, the burst count values in all 20 shift register slots are summed to arrive at a total burst count value. If this total burst count value exceeds a programmable threshold, a radar detected indication is given.

FIG. 4C is a schematic diagram of an example of the pulse counter 412 that may be used in the radar detection system 410 in FIG. 4B. The pulse detector 412 receives the input signal and determines if it contains a valid pulse. The pulse detector 412 also determines a category for a valid pulse according to the pulse width at 420.

In the example shown in FIG. 4C, a valid pulse has a pulse width between at least 50 μsec and at a maximum, 100 μsec. A valid pulse is also identified as falling into one of four categories. For example, the categories may be a first category at 50 to 62.5 μsec, a second category at 62.5 to 75 μsec, a third category at 75 to 87.5 μsec, and a fourth category at 87.5 to 100 μsec. The pulse detector 412 outputs a three-bit output 422 having one bit to indicate whether the pulse is a valid pulse or not, and two bits to indicate which of the four categories the valid pulse width falls into. At 420*a*, the pulse width is determined to be a valid pulse width and its width is determined to fall in a first range. A first range output 422*a* may be formatted with a set valid pulse bit and the two-bit size range category bit set to '00' to indicate that the pulse width is in the first range of sizes. At 420*b*, the pulse width is determined to be a valid pulse width and its width is determined to fall in a second range. A second range output 422*b* may be formatted with a set valid pulse bit and the two-bit size range category bit set to '01' to indicate that the pulse width is in the second range of sizes. At 420*c*, the pulse width is determined to be a valid pulse width and its width is determined to fall in a third range. A third range output 422*c* may be formatted with a set valid pulse bit and the two-bit size range category bit set to '10' to indicate that the pulse width is in the third range of sizes. At 420*d*, the pulse width is determined to be a valid pulse width and its width is determined to fall in a fourth range. A fourth range output 422*d* may be formatted with a set valid pulse bit and the two-bit size range category bit set to '11' to indicate that the pulse width is in the fourth range of sizes. At 420*e*, a valid pulse is not detected and a '0' indicates that a valid bit was not found in the pulse found bit of the three-bit output 422*e*.

Figure 4D:
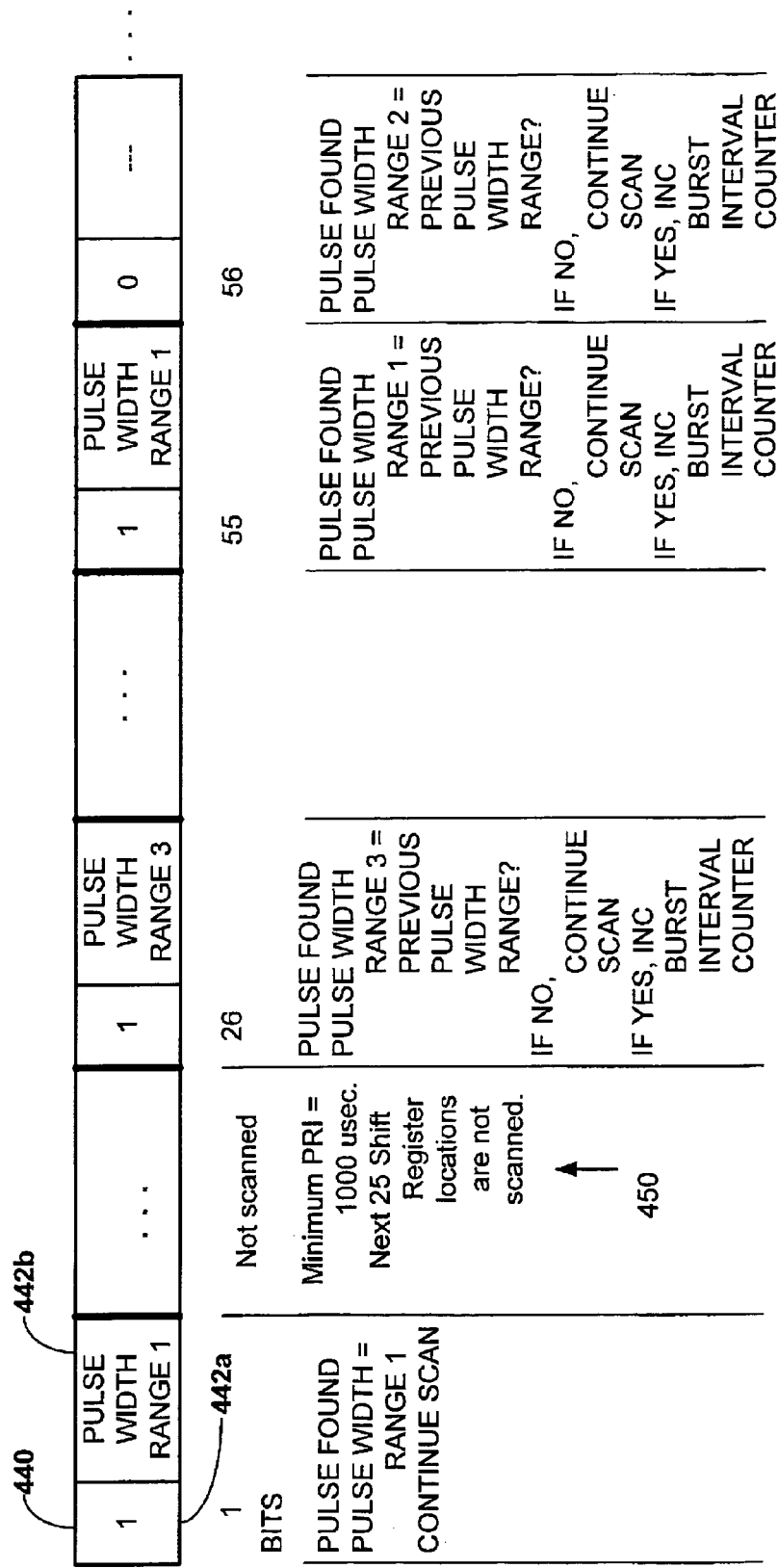
FIG. 4D is a schematic diagram illustrating further shift register operation in the example of the frequency detector in the radar detection system of FIG. 4A.

The three-bit output 422 may be shifted into a 112×3 bit shift register 440 in the frequency detector 414. The frequency detector 414 scans the 112×3 bit shift register 440 every 40 μsec for any PRI that falls within the minimum to maximum PRI values in Table 3 (i.e., 1000-2000 μsec). The length of the shift register is 112 bits, which equates to 4480 μsec; long enough to contain a 3 pulse burst of the maximum PRI. The shift register 440 in the example shown in FIG. 4D is 3 bits wide—1 bit is a valid pulse bit 442*a* and indicates whether or not a valid pulse was detected; and 2 bits are a 2-bit pulse size register 442*b* and indicate the pulse width size category. Only a portion of the shift register 440 is shown in FIG. 4D. In order to detect a valid PRI, the frequency detector 414 looks for both the valid pulse bit 442*a* set and a match of the 2-bit pulse size register 442*b* with that of another first pulse detected.

Example implementations described here with reference to FIGS. 4A-4E implement a shift register as a bit sequence storage device. However, other storage devices may be used as well, such as memory devices (i.e. single-bit, or multi-bit addressable RAM) and other types of registers known in the art.

Referring to FIG. 4D, if a pulse is detected in a 40 μsec interval, a scan of the shift register 440 for a valid PRI is executed. During the scan, the valid pulse bit 442*a* is checked. If the valid pulse bit 442*a* is set, then the 2-bit pulse size register is 442*b* checked to determine if the size category of the detected valid pulse is the same as that of the pulse detected to start the scan. The scan begins at registers far enough from the detected pulse to ensure that a minimum PRI specification is met. For the example in FIG. 4D, the scan begins at registers that correspond to <1000 μsec from the current time. This means that given a 40 μsec interval, the scan begins 25 registers after the first register as shown at 450. Once the scan begins, a valid PRI is detected if a bit is set in a scanned register and its 2-bit pulse size value matches the current pulse size value.

In the example shown in FIG. 4D, the 2-bit pulse size register 442*b* for the pulse detected at 442*a* is 'Size Range 1.' Therefore, as the scan proceeds after register 25, a valid PRI will be detected when a set bit is found in a scanned register with a 2-bit pulse size value set to 'Size Range 1.' At the 26$^{th}$ register, the bit is set, but the 2-bit pulse size register is set to 'Size Range 3.' This is not a valid PRI, therefore, the scan continues. At shift register 55, the valid pulse bit is set and the 2-bit pulse size register is set to 'Size Range 1.' At this point, a valid PRI is detected and the scan is stopped. The interval burst counter 416 (in FIG. 4B) is incremented. Only 2-pulse bursts are counted and the burst counter will only be incremented once (at most) every 40 μsec.

The shift register 440 in FIGS. 4C and 4D is sufficiently large to enable a scan that will cover up to a PRI of twice the maximum PRI given in Table 3 (i.e., 4000 μsec). This allows a 3 pulse burst with a missing middle pulse to still be detected as a valid burst. In an example implementation, the 2-pulse burst detection logic is disabled if the total pulse count in the 112-bit shift register 440 is greater than a programmable threshold to help reduce radar false detections.

Figure 4E:
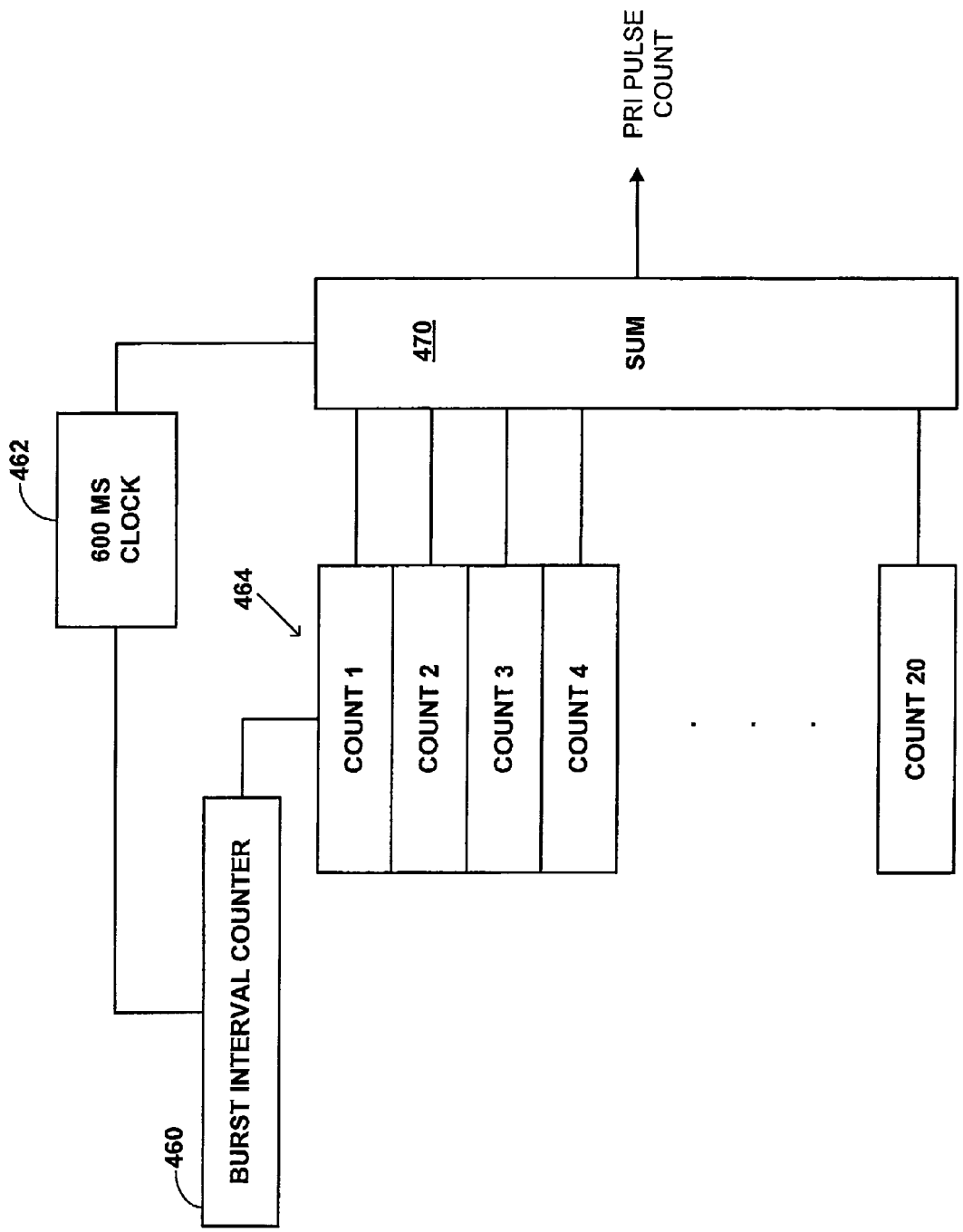
FIG. 4E is a schematic diagram illustrating operation of the burst interval counter and total burst counter that may be implemented in the radar detection system of FIG. 4A.

FIG. 4E is a block diagram showing a burst interval counter 460 connected to a 20 deep shift register 464. A 600 msec clock generates a clock signal. At the end of every 600 msec interval, the current interval burst count in the burst interval counter 460 is clocked into the 20 deep shift register 464. In this example, the worst case number of PRI pulse bursts is 5. The interval burst count should not be >5 if only valid radar bursts are detected. If this value is exceeded, a burst count of zero will be shifted into the 20 deep shift register 464 to reduce radar detection false alarms. Also at the end of every 600 msec interval, an adder 470 sums the burst count values from all 20 shift register 464 locations to generate a total pulse count. If the total pulse count value exceeds a programmable threshold, an indication that radar was detected is provided to the hardware driver software.

In some environments, the possibility of detecting false radar signals may be particularly problematic. The system shown in FIGS. 4A-4E may include a false radar detection function to reduce the likelihood that false radar signals will be detected. Example systems may implement the pulse detector 232 and noise pulse counter 233 described above with reference to FIG. 2D and modify the pulse detector 232 to function as the pulse detector 412 in FIG. 4B to reduce the effect of detecting false radar signals. Other schemes may be used as well.

One of ordinary skill in the art will appreciate that the methods and systems described herein may be implemented in systems having one or more processors with memory resources available for storing program code and data. Implementations of examples consistent with the present invention may or may not use any programming resources available in such systems. That is, examples may operate as hardware-only implementations. One skilled in the art will also appreciate that all or part of systems and methods consistent with the present invention may be stored on or read from other machine-readable media, for example, secondary storage devices such as hard disks, floppy disks, and CD-ROMs; a signal received from a network; or other forms of ROM or RAM either currently known or later developed.

The foregoing description of implementations has been presented for purposes of illustration and description. It is not exhaustive and does not limit the claimed inventions to the precise form disclosed. Modifications and variations are possible in light of the above description or may be acquired from practicing the invention. For example, the described implementation includes software but the invention may be implemented as a combination of hardware and software or in hardware alone. Note also that the implementation may vary between systems. The claims and their equivalents define the scope of the invention.

What is claimed:

1. A method for detecting radar signals in a communication system, the method comprising:
   receiving a raw energy detect signal;
   determining if the raw energy detect signal contains a valid radar pulse, the valid radar pulses having a pulse width within a predetermined limit;
   shifting a bit having a first value if a valid radar pulse was detected or a second value indicating that a valid pulse was not detected in to a shift register having a plurality of taps arranged in a plurality of tap combinations each corresponding to one of a plurality of time-invariant waveforms defined by specified pulse widths and pulse repetition intervals (PRI);
   detecting a set of bits at the plurality of taps in the shift register and counting the number of taps having valid pulses for each tap combination; and
   indicating that the radar signal is detected when the number of taps in the shift register having a valid pulse corresponds to one of the time-invariant waveforms.

2. The method of claim 1 where:
   the step of indicating that the radar signal is detected includes comparing each sum of the number of taps having valid pulses with a threshold number corresponding to a waveform at the tap combination.

3. The method of claim 1 where:
   the specified pulse widths and pulse repetition intervals (PRI) correspond to:

| Pulse Width (μsec) | PRI |
| --- | --- |
| 1 | 555 |
| 1 | 1428 |
| 2 | 3030 |
| 2.5 | 3846. |

4. The method of claim 1 further comprising:
   determining if a pulse is a noise pulse;
   if a noise pulse, incrementing a noise pulse counter;
   comparing the noise pulse counter to a noise pulse threshold number; and
   disabling indication of a radar signal if the noise pulse counter is the same or greater than the noise pulse threshold number.

5. The method of claim 1 further comprising:
   incrementing a total pulse counter when a valid pulse is stored; and
   disabling indication of a radar signal if the total pulse counter exceeds a programmable excessive bit threshold.

6. A method for detecting radar signals in a communication system, the method comprising:
   receiving a raw energy detect signal;
   determining if the raw energy detect signal contains a valid radar pulse, the valid radar pulses having a pulse width within a predetermined limit;
   storing a bit having a first value if a valid radar pulse was detected or a second value indicating that a valid pulse was not detected in a single-bit addressable random access memory (RAM) containing a series of bits stored in sequential order;
   detecting a set of bits at a plurality of waveform-indicating locations in the single bit addressable RAM where selected ones of the plurality of waveform-indicating locations designate time-invariant waveforms having pulse rate intervals (PRI) and pulses per burst that fall within specified ranges, each waveform corresponding to a radar signal, where the set of bits at the plurality of waveform-indicating locations is detected by:
      when the bit has the first value, scanning the single-bit addressable RAM locations starting from about at a location corresponding to a waveform having a shortest specified PRI to about a location corresponding to a waveform having a longest specified PRI;
      when a second bit having the first value is detected, calculating the difference between the location of the second bit and the location of the first bit and setting a current PRI to the difference; and
      continuing the scan of the single-bit addressable RAM to detect a plurality of bits having the first value consistently within the current PRI of each other;
   indicating that a radar signal is detected when the number of bits having a valid pulse consistently within the current PRI of each other and the current PRI corresponds to one of the time-invariant waveforms.

7. The method of claim 6 where:
   the time-invariant waveforms have waveform parameters defined by specified pulse widths, pulse repetition intervals (PRI) and pulses per burst according to:

| Pulse Width (μsec) | PRI | Pulses per Burst |
| --- | --- | --- |
| 1-5 | 150-230 | 23-29 |
| 6-10 | 200-500 | 16-18 |
| 11-20 | 200-500 | 12-16. |

8. The method of claim 6 further comprising:
   determining if a pulse is a noise pulse;
   if a noise pulse, incrementing a noise pulse counter;
   comparing the noise pulse counter to a noise pulse threshold number; and
   disabling indication of a radar signal if the noise pulse counter is the same or greater than the noise pulse threshold number.

9. The method of claim 6 further comprising:
   incrementing a total pulse counter when a valid pulse is stored; and
   disabling indication of a radar signal if the total pulse counter exceeds a programmable excessive bit threshold.

10. A method for detecting radar signals in a communication system, the method comprising:
    receiving a raw energy detect signal;
    determining if the raw energy detect signal contains a valid radar pulse, the valid radar pulse having a pulse width within a predetermined limit, by:
       detecting whether the pulse width is within the range of valid pulses;
       detecting a second pulse forming a 2-pulse burst; and
       determining a sub-range for each detected pulse burst by comparing the interval between the first and second pulses with a plurality of sub-ranges within a range of pulse rate intervals (PRI);
    storing a pulse indicating bit indicating whether or not a 2-pulse burst was detected, and at least one sub-range bit indicating the sub-range of the detected 2-pulse burst, the pulse-indicating and sub-range bits being stored in the bit sequence storage device in sequential order;
    detecting a number of 2-pulse bursts in a number of predetermined intervals;

storing the number of 2-pulse bursts in each of the number of predetermined intervals in a set of N registers;

adding the number of pulse bursts in the N registers; and indicating the radar signal when the sum of pulse bursts is at least a threshold number.

11. The method of claim 10 where:

the predetermined limit of the pulse width, the PRI between the first and second pulses, the pulses per burst, and the number of pulse bursts indicative of a waveform corresponding to the radar signal is defined by:

| Pulse Width (μsec) | PRI | Pulses per Burst | Number of bursts |
|---|---|---|---|
| 50-100 | 1000-2000 | 1-3 | 8-20. |

12. The method of claim 10 further comprising:

determining if a pulse is a noise pulse;

if a noise pulse, incrementing a noise pulse counter;

comparing the noise pulse counter to a noise pulse threshold number; and disabling indication of a radar signal if the noise pulse counter is the same or greater than the noise pulse threshold number.

13. The method of claim 10 further comprising:

incrementing a total pulse counter when a valid pulse is stored; and disabling indication of a radar signal if the total pulse counter exceeds a programmable excessive bit threshold.

14. A method for detecting radar signals in a communication system, the method comprising:

receiving a raw energy detect signal;

determining if the raw energy detect signal contains a valid radar pulse by detecting whether the pulse width is within the range of valid pulses;

determining a waveform type from a group of waveform types using the pulse width, the group of waveform types consisting of: time-invariant with fixed parameters, time-invariant with variable parameters, and time-variant;

selecting a frequency detector from a plurality of frequency detectors based on the waveform type for performing the steps of:

storing a bit having a first value if a valid radar pulse was detected or a second value indicating that a valid pulse was not detected to a bit sequence storage device containing a series of bits, the bits being stored in the bit sequence storage device in sequential order; and detecting a set of bits at a plurality of waveform-indicating locations in the bit sequence storage device where selected ones of the plurality of waveform-indicating locations designate corresponding waveforms, each corresponding to a radar signal;

indicating that a radar signal is detected when the number of waveform-indicating locations having a valid pulse corresponds to one of the waveform types.

15. The method of claim 14 further comprising:

when the waveform type is time invariant with fixed parameters, selecting a first frequency detector to perform the steps of storing the bit and detecting the set of bits for waveforms having the following waveform specification:

| Pulse Width (μsec) | PRI |
|---|---|
| 1 | 555 |
| 1 | 1428 |
| 2 | 3030 |
| 2.5 | 3846. |

16. The method of claim 14 further comprising:

when the waveform type is time invariant with variable parameters, selecting a second frequency detector to perform the steps of storing the bit and detecting the set of bits waveforms having the following waveform specification:

| Pulse Width (μsec) | PRI | Pulses per Burst |
|---|---|---|
| 1-5 | 150-230 | 23-29 |
| 6-10 | 200-500 | 16-18 |
| 11-20 | 200-500 | 12-16. |

17. The method of claim 14 further comprising:

when the waveform type is time variant, selecting a third frequency detector to perform the steps of storing the bit and detecting the set of bits for waveforms having the following waveform specification:

| Pulse Width (μsec) | PRI | Pulses per Burst | Number of bursts |
|---|---|---|---|
| 50-100 | 1000-2000 | 1-3 | 8-20. |

18. The method of claim 16 where:

the step of selecting the second frequency detector to perform the steps of storing the bit and detecting the set of bits for time-invariant waveforms includes:

using a first single-bit addressable RAM having sufficient storage space to store a maximum waveform interval for processing waveforms with variable parameters having the following waveform specification:

| Pulse Width (μsec) | PRI | Pulses per Burst |
|---|---|---|
| 1-5 | 150-230 | 23-29 | using a fourth frequency detector to process waveforms with variable parameters having the following waveform specification:

| Pulse Width (μsec) | PRI | Pulses per Burst |
|---|---|---|
| 6-10 | 200-500 | 16-18 |
| 11-20 | 200-500 | 12-16 | the fourth frequency detector having a shift register having sufficient storage space to store a part of the maximum waveform interval, where the fourth frequency detector performs steps of:

storing a maximum pulse interval at a predetermined interval less than the maximum waveform interval; and calculating a total pulse count by adding a previous number of maximum pulse intervals.

19. The method of claim 14 further comprising:
determining if a pulse is a noise pulse;
if a noise pulse, incrementing a noise pulse counter;
comparing the noise pulse counter to a noise pulse threshold number; and
disabling indication of a radar signal if the noise pulse counter is the same or greater than the noise pulse threshold number.

20. The method of claim 14 further comprising:
incrementing a total pulse counter when a valid pulse is stored; and
disabling indication of a radar signal if the total pulse counter exceeds a programmable excessive bit threshold.

21. A system for detecting a radar signal in a communications device comprising:

a pulse detector to detect pulses in a raw energy signal having a pulse width within a predetermined minimum and maximum pulse width, the pulse detector operable to output a bit having a first value when the pulse width is within the maximum and minimum or having a second value when the pulse width is not within the maximum and minimum; and a frequency detector having at least one shift register for receiving the bit output from the pulse detector, the at least one shift register having taps at waveform-indicating locations, the frequency detector operable to detect whether, the detected pulses conform to one of a plurality of time invariant waveforms by determining if the bits at the taps correspond to a tap combination corresponding to one of the time invariant waveforms, the frequency detector further comprising:

a clock for generating a shift rate to shift the shift registers by one bit and to input the bit output from the pulse detector; and a multiplexer to receive the taps in tap combinations corresponding to a selected waveform parameter, the multiplexer triggered by a tap selection signal to output the tap combinations corresponding to the tap selection signal; and a pulse counter to determine a number of bits indicating valid pulses to compare to a threshold number indicative of a radar signal.

22. The system of claim 21 where:
the frequency detector detects a set of bits in waveform-indicating locations for time-invariant waveforms with fixed parameters having the following waveform specification:

| Pulse Width (μsec) | PRI |
|---|---|
| 1 | 555 |
| 1 | 1428 |
| 2 | 3030 |
| 2.5 | 3846. |

23. A system for detecting a radar signal in a communications device comprising:

a pulse detector to detect pulses in a raw energy signal having a pulse width within a predetermined minimum and maximum pulse width, the pulse detector operable to output a bit having a first value when the pulse width is within the maximum and minimum or having a second value when the pulse width is not within the maximum and minimum; and a frequency detector having a single-bit addressable RAM configured to receive the bit output from the pulse detector at a current shift register address, the frequency detector operable to perform a pulse repetition interval (PRI) scan of the single-bit addressable RAM for a scan size starting at a scan start offset from the current shift register and to set a current PRI as being the offset between the current shift register and the location at which a set bit was detected during the scan, the frequency detector further operable to continue with subsequent PRI scans, to count the number of set bits encountered with the same current PRI value, and to indicate detection of a radar signal when a threshold number of bits with the same current PRI value is reached and the current PRI value corresponds to a specified PRI value for a time invariant waveform.

24. The system of claim 23 where the frequency detector performs subsequent PRI scans by updating the current PRI value each time a scan is performed, and by scanning a section of the single-bit addressable RAM a tap variance around the location that is the updated current PRI value away from the location of the last set bit.

25. The system of claim 23 where the time invariant waveforms have the following waveform specifications:

| Pulse Width (μsec) | PRI | Pulses per Burst |
|---|---|---|
| 1-5 | 150-230 | 23-29 |
| 6-10 | 200-500 | 16-18 |
| 11-20 | 200-500 | 12-16. |

26. A system for detecting a radar signal in a communications device comprising:

a pulse detector to detect pulses in a raw energy signal having a pulse width within a predetermined minimum and maximum pulse width, the pulse detector operable to output a bit having a first value when the pulse width is within the maximum and minimum or having a second value when the pulse width is not within the maximum and minimum, the pulse detector further configured to determine a sub-range by comparing the pulse width with a plurality of pulse width sub-ranges within a pulse repetition interval (PRI) range; and a frequency detector configured to identify a valid pulse burst when two valid pulses having the same sub-range are identified by the pulse detector, the frequency detector having:

a shift register having storage sufficient to store a part of the maximum waveform interval, and configured to receive the bit output from the pulse detector and the sub-range for each bit;

an interval burst counter to count the pulse bursts detected in predetermined intervals; and a total burst counter to count the number of pulse bursts detected in a number of predetermined intervals;

where indication of a radar signal is generated when the number of pulse bursts is within a range of pulse bursts specified for a time variant waveform.

27. The system of claim 26 where the time variant waveforms have the following waveform specifications:

| Pulse Width (μsec) | PRI | Pulses per Burst |
|---|---|---|
| 1-5 | 150-230 | 23-29. |

28. A system for detecting a radar signal in a communications device comprising:
- a pulse detector to detect pulses in a raw energy signal having a pulse width within a predetermined minimum and maximum pulse width, the pulse detector operable to output a bit having a first value when the pulse width is within the maximum and minimum or having a second value when the pulse width is not within the maximum and minimum;
- a first frequency detector having at least one shift register for receiving the bit output from the pulse detector, the at least one shift register having taps at waveform-indicating locations, the taps arranged in tap combinations corresponding to time invariant waveforms according to specified pulse repetition intervals (PRI), the first frequency detector configured to indicate a radar signal when a threshold number of taps in a given tap combination are set to the first value; and
- a second frequency detector having a single-bit addressable RAM configured to receive the bit output from the pulse detector at a current shift register address, the frequency detector operable to perform a PRI scan of the single-bit addressable RAM for a scan size starting at a scan start offset from the current shift register and to set a current PRI as being the offset between the current shift register and the location at which a set bit was detected during the scan, the frequency detector further operable to continue with subsequent PRI scans, to count the number of set bits encountered with the same current PRI value, and to indicate a radar signal when a threshold number of set bits with the same current PRI value are encountered.

29. The system of claim 28 where the first frequency detector includes tap combinations conforming to time invariant waveforms having the following waveform specifications:

| Pulse Width (μsec) | PRI |
|---|---|
| 1 | 555 |
| 1 | 1428 |
| 2 | 3030 |
| 2.5 | 3846. |

30. The system of claim 28 where the second frequency detector scans for PRI values that conform to the following waveform specification:

| Pulse Width (μsec) | PRI | Pulses per Burst |
|---|---|---|
| 1-5 | 150-230 | 23-29 |
| 6-10 | 200-500 | 16-18 |
| 11-20 | 200-500 | 12-16. |

31. The system of claim 28 where the pulse detector is configured to set a bit to indicate a valid pulse burst when a pulse interval between two pulses having a valid pulse width is within a PRI range, and at least one sub-range bit to indicate that the pulse width is within one of a number of sub-ranges within the PRI range; the system further comprising:
- a third frequency detector having:
  - an interval burst counter to count the pulse bursts detected by the third frequency detector in predetermined intervals; and
  - a total burst counter to count the number of pulse bursts detected in a number of predetermined intervals;
  - where the third frequency detector is configured to indicate a radar signal when the total burst counter is a threshold number of pulse bursts.

32. The system of claim 28 where the first frequency counter further includes:
- a multiplexer to receive the taps in tap combinations corresponding to a selected waveform parameter, the multiplexer triggered by a tap selection signal to output the tap combinations corresponding to the tap selection signal; and
- a pulse counter to determine a number of bits indicating valid pulses to compare to the threshold number indicative of a radar signal.

33. The system of claim 28 where:
the second frequency detector detects the set of bits in waveform-indicating locations for time-invariant waveforms with variable parameters having the following waveform specification:

| Pulse Width (μsec) | PRI | Pulses per Burst |
|---|---|---|
| 1-5 | 150-230 | 23-29 |
| 6-10 | 200-500 | 16-18 |
| 11-20 | 200-500 | 12-16. |

34. The system of claim 31 where:
the third frequency detector detects the set of bits in waveform-indicating locations for time-variant waveforms having the following waveform specification:

| Pulse Width (μsec) | PRI | Pulses per Burst | Number of bursts |
|---|---|---|---|
| 50-100 | 1000-2000 | 1-3 | 8-20. |

35. The system of claim 28 further comprising:
a noise pulse handler to determine whether a pulse is noise;
a noise pulse counter to count noise pulses and to disable radar signal detection if the number of noise pulses is greater than or equal to a noise pulse threshold.

36. The method of claim 28 further comprising:
a total pulse counter that is incremented when a valid pulse is stored, where indication of a radar signal is disabled if the total pulse counter exceeds a programmable excessive bit threshold.

\* \* \* \* \*